US012647953B2

(12) United States Patent
Nam et al.

(10) Patent No.: US 12,647,953 B2
(45) Date of Patent: Jun. 2, 2026

(54) CHANNEL STATE INFORMATION REPORTING ON A PHYSICAL UPLINK SHARED CHANNEL WITH MULTIPLE UPLINK BANDWIDTH PARTS

(71) Applicant: QUALCOMM Incorporated, San Diego, CA (US)

(72) Inventors: Wooseok Nam, San Diego, CA (US); Yu Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 330 days.

(21) Appl. No.: 18/263,120

(22) PCT Filed: Mar. 3, 2021

(86) PCT No.: PCT/CN2021/078863
§ 371 (c)(1),
(2) Date: Jul. 26, 2023

(87) PCT Pub. No.: WO2022/183400
PCT Pub. Date: Sep. 9, 2022

(65) Prior Publication Data
US 2024/0089936 A1 Mar. 14, 2024

(51) Int. Cl.
*H04W 72/04* (2023.01)
*H04B 7/06* (2006.01)
(Continued)

(52) U.S. Cl.
CPC ...... *H04W 72/0446* (2013.01); *H04B 7/0626* (2013.01); *H04W 52/146* (2013.01);
(Continued)

(58) Field of Classification Search
CPC ........... H04W 72/0446; H04W 52/146; H04W 72/0457; H04W 72/1268; H04W 72/232;
(Continued)

(56) References Cited

U.S. PATENT DOCUMENTS 10,439,700 B2    10/2019  Kim et al.
11,109,368 B2 *  8/2021   Ying ......................... H04L 5/00
(Continued)

FOREIGN PATENT DOCUMENTS

CN          110167062 A      8/2019
CN          111656714 A      9/2020

OTHER PUBLICATIONS

VIVO: "Remaining Issues on CSI Reporting", 3GPP TSG RAN WG1 Meeting #92, R1-1801519, Mar. 2, 2018 (Mar. 2, 2018), Sections 2-3, 10 Pages (Year: 2018).*
(Continued)

*Primary Examiner* — Lan-Huong Truong
(74) *Attorney, Agent, or Firm* — Holland & Hart LLP

(57) ABSTRACT

Methods, systems, and devices for wireless communications are described. The method may include receiving a configuration of a set of multiple report slot offset parameters, where a subset of the set of multiple report slot offset parameters is associated with a bandwidth part of a set of multiple bandwidth parts configured for the UE, receiving, during a first slot, a message triggering a channel state information report on a physical uplink shared channel of the bandwidth part, selecting a second slot for transmitting the channel state information report based on the first slot and the subset of the set of multiple report slot offset parameters associated with the bandwidth part, and transmitting, during the second slot, the channel state information report.

21 Claims, 19 Drawing Sheets

(51) Int. Cl.

| | |
|---|---|
| *H04W 52/14* | (2009.01) |
| *H04W 72/0446* | (2023.01) |
| *H04W 72/0457* | (2023.01) |
| *H04W 72/1268* | (2023.01) |
| *H04W 72/232* | (2023.01) |

(52) U.S. Cl.
CPC ... *H04W 72/0457* (2023.01); *H04W 72/1268* (2013.01); *H04W 72/232* (2023.01)

(58) Field of Classification Search
CPC .... H04W 72/23; H04L 5/0057; H04L 5/0094; H04B 7/0626
See application file for complete search history.

(56) References Cited

U.S. PATENT DOCUMENTS

| | | | | |
|---|---|---|---|---|
| 11,943,169 | B2 * | 3/2024 | Yokomakura | H04L 5/0094 |
| 11,968,577 | B2 * | 4/2024 | Jeon | H04W 52/38 |
| 2020/0313831 | A1 | 10/2020 | Kim et al. | |
| 2022/0095309 | A1 * | 3/2022 | MolavianJazi | H04W 72/56 |
| 2022/0173784 | A1 * | 6/2022 | Gao | H04B 7/0874 |
| 2023/0111063 | A1 * | 4/2023 | Ji | H04L 5/0012 |
| | | | | 370/329 |
| 2023/0171741 | A1 * | 6/2023 | Ko | H04W 72/54 |
| | | | | 370/329 |
| 2025/0119268 | A1 * | 4/2025 | Rudolf | H04L 5/0053 |

OTHER PUBLICATIONS

3GPP TS 38.214: "3rd Generation Partnership Project, Technical Specification Group Radio Access Network, NR, Physical Layer Procedures for Data (Release 16)", DRAFT38214-G40, V16.4.0, (Feb. 2020), 3GPP, Mobile Competence Centre, 650, Route Des Lucioles, F-06921 Sophia-Antipolis Cedex, France, vol. RAN WG1, No. Jan. 8, 2021, 169 Pages, XP051999688.

Ericsson: "[Post109bis-e][933][eMIMO] RRC Open Issues (Ericsson)", 3GPP TSG-RAN WG2 Meeting #110e Tdoc, R2-2004465, Jun. 12, 2020, 50 Pages, the whole document.

International Search Report and Written Opinion—PCT/CN2021/078863—ISA/EPO—Nov. 25, 2021.

VIVO: "Remaining Issues on CSI Reporting", 3GPP TSG RAN WG1 Meeting #92, R1-1801519, Mar. 2, 2018 (Mar. 2, 2018), Sections 2-3, 10 Pages.

* cited by examiner

100

| ReportSlotOffsetList | |
|---|---|
| Entry index | Slot offset |
| 0 | $a_0$ |
| ⋮ | ⋮ |
| $L-1$ | $a_{L-1}$ |

605

600

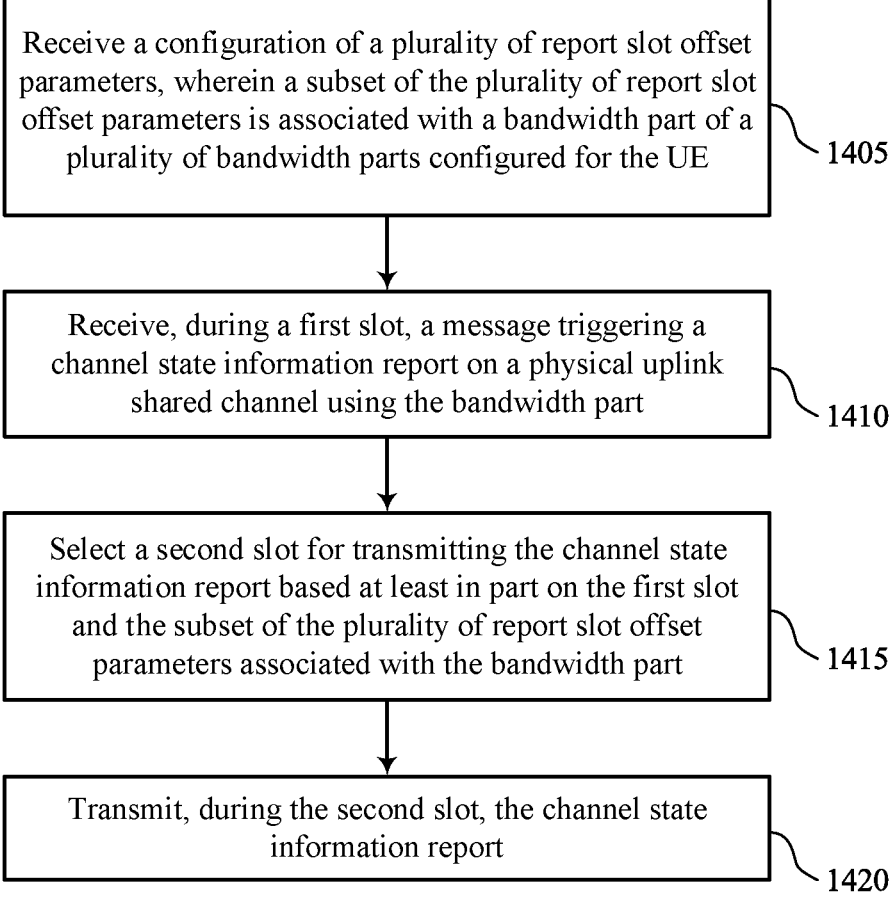

Receive a configuration of a plurality of report slot offset parameters, wherein a subset of the plurality of report slot offset parameters is associated with a bandwidth part of a plurality of bandwidth parts configured for the UE

1405

Receive, during a first slot, a message triggering a channel state information report on a physical uplink shared channel using the bandwidth part

1410

Select a second slot for transmitting the channel state information report based at least in part on the first slot and the subset of the plurality of report slot offset parameters associated with the bandwidth part

1415

Transmit, during the second slot, the channel state information report

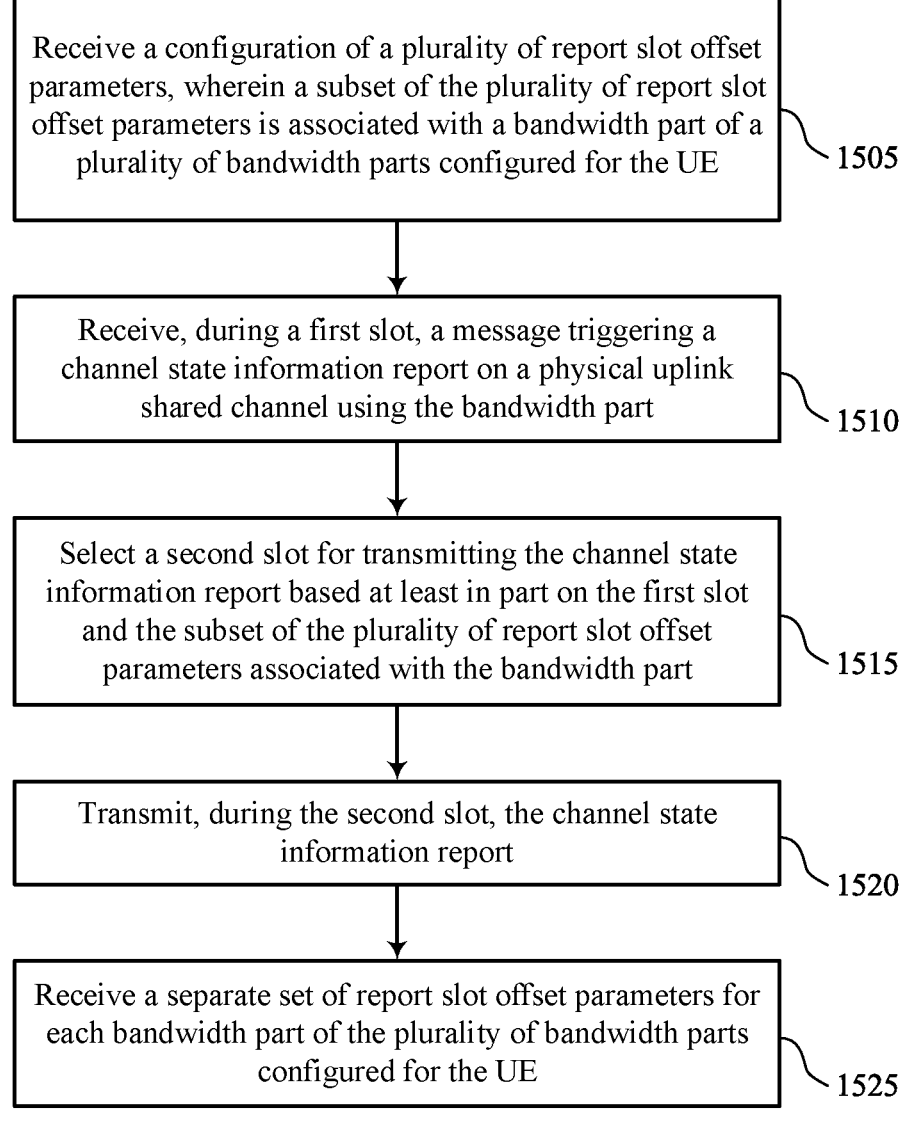

Receive a configuration of a plurality of report slot offset parameters, wherein a subset of the plurality of report slot offset parameters is associated with a bandwidth part of a plurality of bandwidth parts configured for the UE

1505

Receive, during a first slot, a message triggering a channel state information report on a physical uplink shared channel using the bandwidth part

1510

Select a second slot for transmitting the channel state information report based at least in part on the first slot and the subset of the plurality of report slot offset parameters associated with the bandwidth part

1515

Transmit, during the second slot, the channel state information report

1520

Receive a separate set of report slot offset parameters for each bandwidth part of the plurality of bandwidth parts configured for the UE

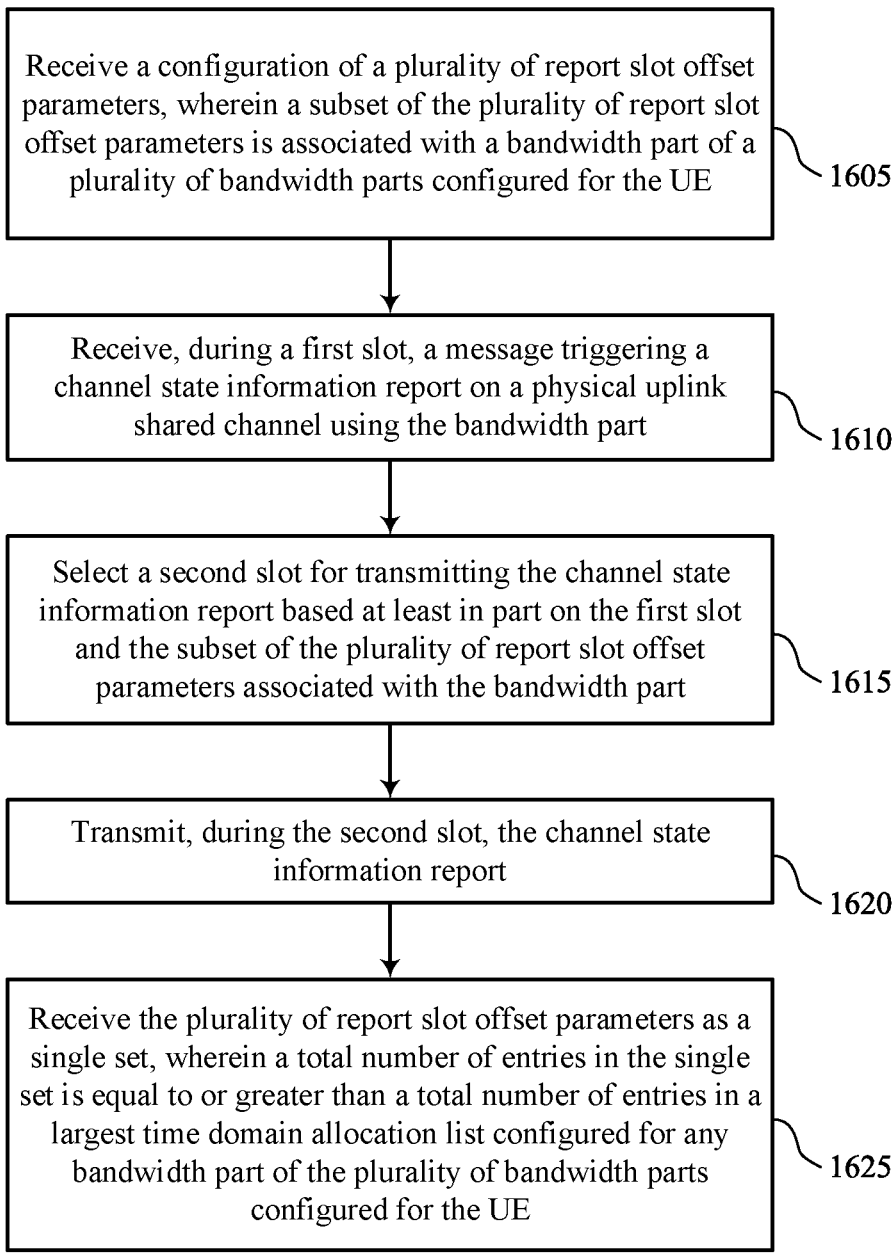

Receive a configuration of a plurality of report slot offset parameters, wherein a subset of the plurality of report slot offset parameters is associated with a bandwidth part of a plurality of bandwidth parts configured for the UE
1605

Receive, during a first slot, a message triggering a channel state information report on a physical uplink shared channel using the bandwidth part
1610

Select a second slot for transmitting the channel state information report based at least in part on the first slot and the subset of the plurality of report slot offset parameters associated with the bandwidth part
1615

Transmit, during the second slot, the channel state information report
1620

Receive the plurality of report slot offset parameters as a single set, wherein a total number of entries in the single set is equal to or greater than a total number of entries in a largest time domain allocation list configured for any bandwidth part of the plurality of bandwidth parts configured for the UE
1625

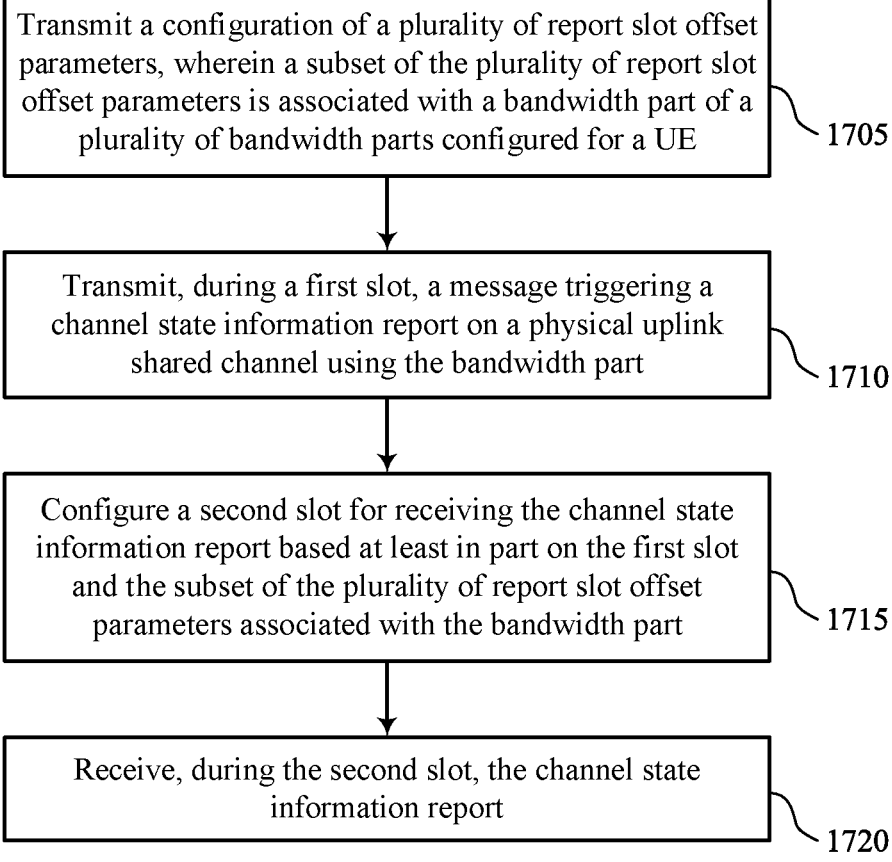

Transmit a configuration of a plurality of report slot offset parameters, wherein a subset of the plurality of report slot offset parameters is associated with a bandwidth part of a plurality of bandwidth parts configured for a UE

1705

Transmit, during a first slot, a message triggering a channel state information report on a physical uplink shared channel using the bandwidth part

1710

Configure a second slot for receiving the channel state information report based at least in part on the first slot and the subset of the plurality of report slot offset parameters associated with the bandwidth part

1715

Receive, during the second slot, the channel state information report

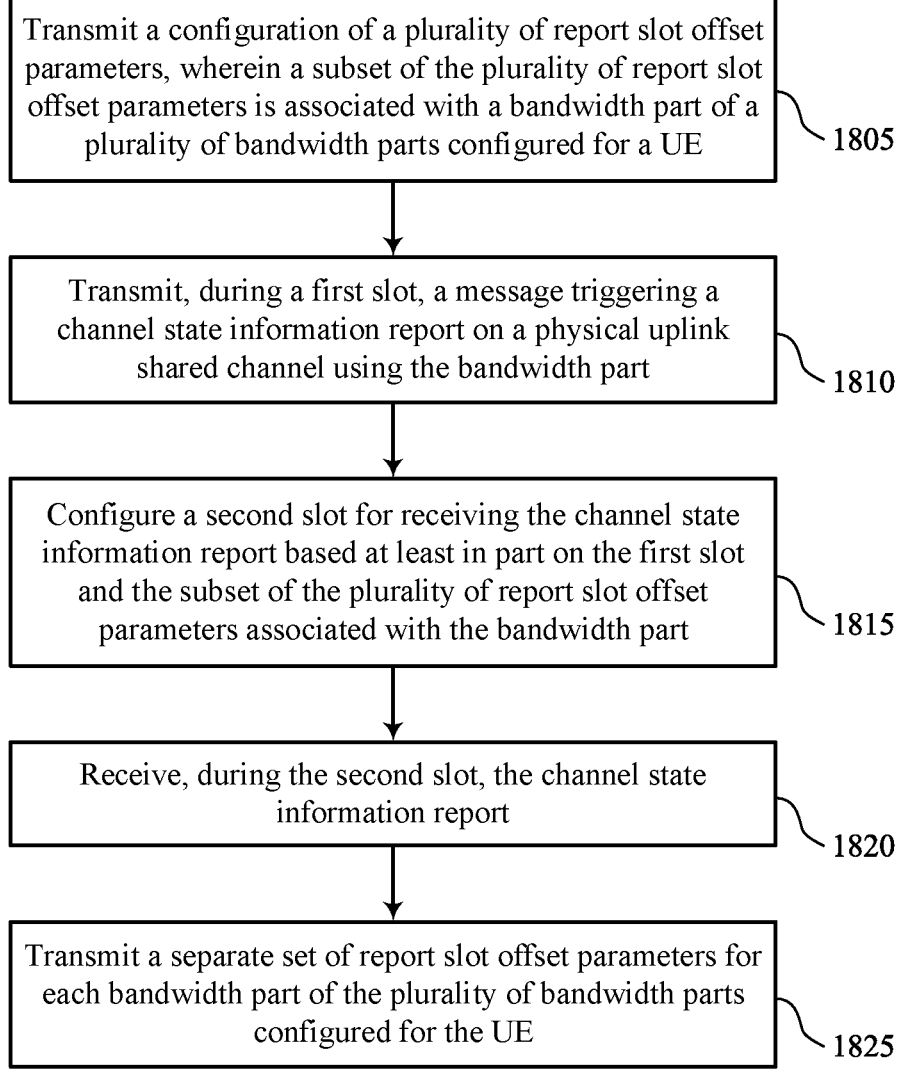

Transmit a configuration of a plurality of report slot offset parameters, wherein a subset of the plurality of report slot offset parameters is associated with a bandwidth part of a plurality of bandwidth parts configured for a UE

1805

Transmit, during a first slot, a message triggering a channel state information report on a physical uplink shared channel using the bandwidth part

1810

Configure a second slot for receiving the channel state information report based at least in part on the first slot and the subset of the plurality of report slot offset parameters associated with the bandwidth part

1815

Receive, during the second slot, the channel state information report

1820

Transmit a separate set of report slot offset parameters for each bandwidth part of the plurality of bandwidth parts configured for the UE

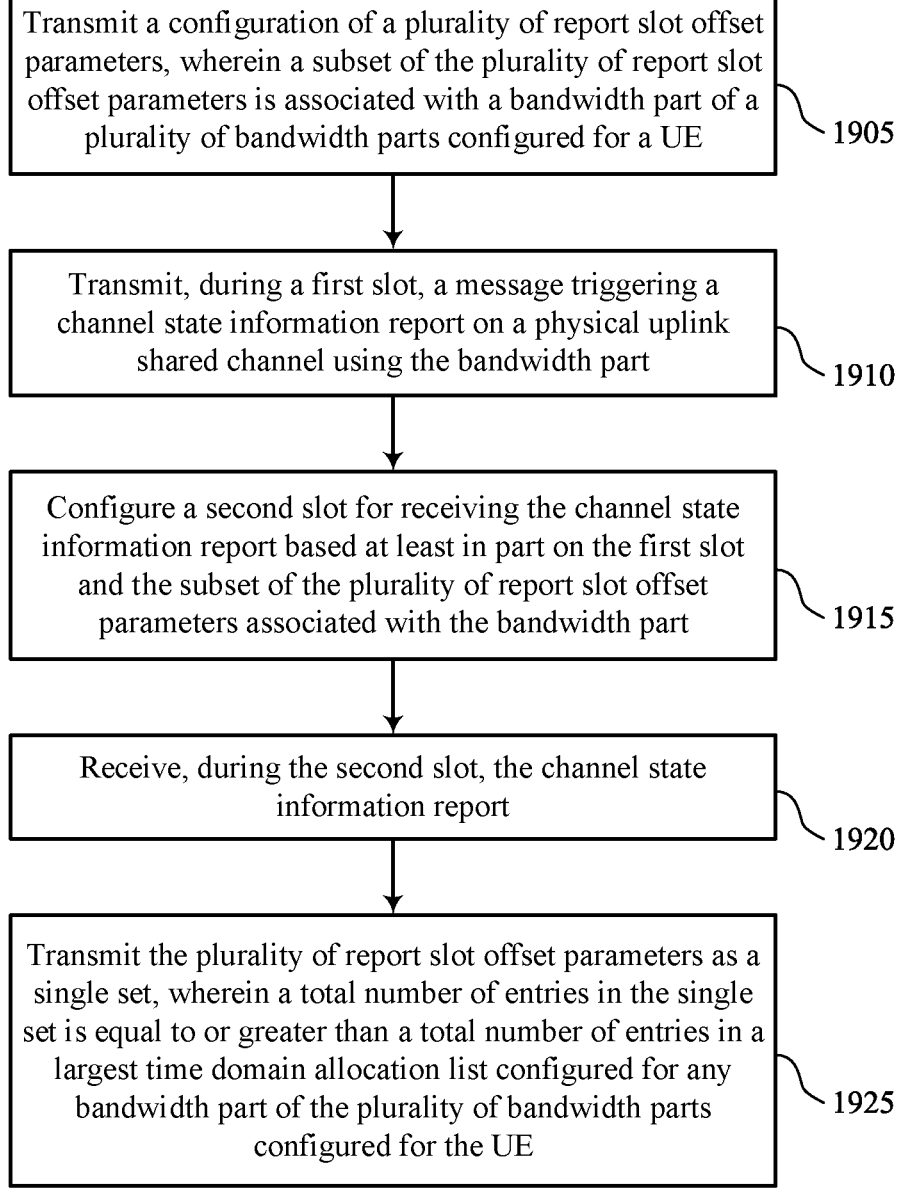

Transmit a configuration of a plurality of report slot offset parameters, wherein a subset of the plurality of report slot offset parameters is associated with a bandwidth part of a plurality of bandwidth parts configured for a UE ⟩ 1905

Transmit, during a first slot, a message triggering a channel state information report on a physical uplink shared channel using the bandwidth part ⟩ 1910

Configure a second slot for receiving the channel state information report based at least in part on the first slot and the subset of the plurality of report slot offset parameters associated with the bandwidth part ⟩ 1915

Receive, during the second slot, the channel state information report ⟩ 1920

Transmit the plurality of report slot offset parameters as a single set, wherein a total number of entries in the single set is equal to or greater than a total number of entries in a largest time domain allocation list configured for any bandwidth part of the plurality of bandwidth parts configured for the UE ⟩ 1925

CHANNEL STATE INFORMATION REPORTING ON A PHYSICAL UPLINK SHARED CHANNEL WITH MULTIPLE UPLINK BANDWIDTH PARTS

CROSS REFERENCE

The present application is a 371 national stage filing of International PCT Application No. PCT/CN2021/078863 by NAM et al. entitled "CHANNEL STATE INFORMATION REPORTING ON A PHYSICAL UPLINK SHARED CHANNEL WITH MULTIPLE UPLINK BANDWIDTH PARTS," filed Mar. 3, 2021, which is assigned to the assignee hereof, and which is expressly incorporated by reference in its entirety herein.

FIELD OF TECHNOLOGY

The following relates to wireless communications, including channel state information reporting on a physical uplink shared channel with multiple uplink bandwidth parts.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless systems may support channel state information reporting on a physical uplink shared channel.

SUMMARY

The described techniques relate to improved methods, systems, devices, and apparatuses that support channel state information reporting on a physical uplink shared channel with multiple uplink bandwidth parts. Generally, the described techniques provide for a user equipment (UE) be configured with a separate report slot offset list for each uplink bandwidth part used by the UE, and to use the indicated report slot offset list to determine a slot for channel state information (CSI) reporting on a given bandwidth part. Alternatively, the described techniques provide for a UE to be configured with a report slot offset list for use with CSI reporting on all uplink bandwidth parts, such that the report slot offset list has at least as many entries as the largest time domain resource allocation list configured for any of the uplink bandwidth parts supported by the UE. In either case, the UE may receive a message during a first slot that triggers a later CSI report on a physical uplink shared channel using the bandwidth part. The UE may select a second slot for transmitting the CSI report on the bandwidth part based on the first slot and a report slot offset selected from the relevant configured report slot offset list. The UE may transmit, during the second slot, the channel state information report.

A method for wireless communication at a user equipment (UE) is described. The method may include receiving a configuration of a set of multiple report offset parameters, where a subset of the set of multiple report offset parameters is associated with a bandwidth part of a set of multiple bandwidth parts configured for the UE, receiving, during a first slot, a message triggering a channel state information report on a physical uplink shared channel of the bandwidth part, selecting a second slot for transmitting the channel state information report based on the first slot and the subset of the set of multiple report offset parameters associated with the bandwidth part, and transmitting, during the second slot, the channel state information report.

An apparatus for wireless communication at a UE is described. The apparatus may include a processor, memory coupled with the processor, and instructions stored in the memory. The instructions may be executable by the processor to cause the apparatus to receive a configuration of a set of multiple report offset parameters, where a subset of the set of multiple report offset parameters is associated with a bandwidth part of a set of multiple bandwidth parts configured for the UE, receive, during a first slot, a message triggering a channel state information report on a physical uplink shared channel of the bandwidth part, select a second slot for transmitting the channel state information report based on the first slot and the subset of the set of multiple report offset parameters associated with the bandwidth part, and transmit, during the second slot, the channel state information report.

Another apparatus for wireless communication at a UE is described. The apparatus may include means for receiving a configuration of a set of multiple report offset parameters, where a subset of the set of multiple report offset parameters is associated with a bandwidth part of a set of multiple bandwidth parts configured for the UE, means for receiving, during a first slot, a message triggering a channel state information report on a physical uplink shared channel of the bandwidth part, means for selecting a second slot for transmitting the channel state information report based on the first slot and the subset of the set of multiple report offset parameters associated with the bandwidth part, and means for transmitting, during the second slot, the channel state information report.

A non-transitory computer-readable medium storing code for wireless communication at a UE is described. The code may include instructions executable by a processor to receive a configuration of a set of multiple report offset parameters, where a subset of the set of multiple report offset parameters is associated with a bandwidth part of a set of multiple bandwidth parts configured for the UE, receive, during a first slot, a message triggering a channel state information report on a physical uplink shared channel of the bandwidth part, select a second slot for transmitting the channel state information report based on the first slot and the subset of the set of multiple report offset parameters associated with the bandwidth part, and transmit, during the second slot, the channel state information report.

In some examples of the method, apparatuses, and non-transitory computer-readable medium described herein, receiving the configuration of the set of multiple report offset parameters may include operations, features, means, or instructions for receiving a separate set of report offset parameters for each bandwidth part of the set of multiple bandwidth parts configured for the UE.

In some examples of the method, apparatuses, and non-transitory computer-readable medium described herein, receiving the configuration of the set of multiple report offset parameters may include operations, features, means, or instructions for receiving the set of multiple report offset parameters as a single set, where a total number of entries in the single set may be equal to or greater than a total number of entries in a largest time domain resource allocation list configured for any bandwidth part of the set of multiple bandwidth parts configured for the UE.

In some examples of the method, apparatuses, and non-transitory computer-readable medium described herein, the subset of the set of multiple report offset parameters associated with the bandwidth part includes a portion of the single set with a same number of entries as a time domain resource allocation list configured for the bandwidth part.

In some examples of the method, apparatuses, and non-transitory computer-readable medium described herein, selecting the second slot for transmitting the channel state information report may include operations, features, means, or instructions for determining a resource allocation for the second slot, where determining the resource allocation for the second slot may be based on the time domain resource allocation list configured for the bandwidth part.

In some examples of the method, apparatuses, and non-transitory computer-readable medium described herein, selecting the second slot for transmitting the channel state information report may include operations, features, means, or instructions for selecting a report slot offset from the subset of the set of multiple report slot offsets associated with the bandwidth part.

Some examples of the method, apparatuses, and non-transitory computer-readable medium described herein may further include operations, features, means, or instructions for receiving a set of multiple uplink power control parameters, where a subset of the set of multiple uplink power control parameters may be associated with the bandwidth part.

Some examples of the method, apparatuses, and non-transitory computer-readable medium described herein may further include operations, features, means, or instructions for selecting a power control parameter of the subset of the set of multiple uplink power control parameters based on the bandwidth part.

In some examples of the method, apparatuses, and non-transitory computer-readable medium described herein, a transmit power of the channel state information report may be based on the selected uplink power control parameter.

In some examples of the method, apparatuses, and non-transitory computer-readable medium described herein, selecting the second slot for transmitting the channel state information report may include operations, features, means, or instructions for performing a measurement of a channel state information reference signal, where the channel state information report may be based on the measurement.

In some examples of the method, apparatuses, and non-transitory computer-readable medium described herein, the subset of the set of multiple report offset parameters includes a time domain offset between a physical downlink control channel of the first slot and a physical uplink shared channel of the second slot.

In some examples of the method, apparatuses, and non-transitory computer-readable medium described herein, the message triggering the channel state information report includes a downlink control information message or a media access control control element message.

A method for wireless communication at a base station is described. The method may include transmitting a configuration of a set of multiple report offset parameters, where a subset of the set of multiple report offset parameters is associated with a bandwidth part of a set of multiple bandwidth parts configured for a UE, transmitting, during a first slot, a message triggering a channel state information report on a physical uplink shared channel of the bandwidth part, configuring a second slot for receiving the channel state information report based on the first slot and the subset of the set of multiple report offset parameters associated with the bandwidth part, and receiving, during the second slot, the channel state information report.

An apparatus for wireless communication at a base station is described. The apparatus may include a processor, memory coupled with the processor, and instructions stored in the memory. The instructions may be executable by the processor to cause the apparatus to transmit a configuration of a set of multiple report offset parameters, where a subset of the set of multiple report offset parameters is associated with a bandwidth part of a set of multiple bandwidth parts configured for a UE, transmit, during a first slot, a message triggering a channel state information report on a physical uplink shared channel of the bandwidth part, configure a second slot for receiving the channel state information report based on the first slot and the subset of the set of multiple report offset parameters associated with the bandwidth part, and receive, during the second slot, the channel state information report.

Another apparatus for wireless communication at a base station is described. The apparatus may include means for transmitting a configuration of a set of multiple report offset parameters, where a subset of the set of multiple report offset parameters is associated with a bandwidth part of a set of multiple bandwidth parts configured for a UE, means for transmitting, during a first slot, a message triggering a channel state information report on a physical uplink shared channel of the bandwidth part, means for configuring a second slot for receiving the channel state information report based on the first slot and the subset of the set of multiple report offset parameters associated with the bandwidth part, and means for receiving, during the second slot, the channel state information report.

A non-transitory computer-readable medium storing code for wireless communication at a base station is described. The code may include instructions executable by a processor to transmit a configuration of a set of multiple report offset parameters, where a subset of the set of multiple report offset parameters is associated with a bandwidth part of a set of multiple bandwidth parts configured for a UE, transmit, during a first slot, a message triggering a channel state information report on a physical uplink shared channel of the bandwidth part, configure a second slot for receiving the channel state information report based on the first slot and the subset of the set of multiple report offset parameters associated with the bandwidth part, and receive, during the second slot, the channel state information report.

In some examples of the method, apparatuses, and non-transitory computer-readable medium described herein, transmitting the configuration of the set of multiple report offset parameters may include operations, features, means, or instructions for transmitting a separate set of report offset parameters for each bandwidth part of the set of multiple bandwidth parts configured for the UE.

In some examples of the method, apparatuses, and non-transitory computer-readable medium described herein, transmitting the configuration of the set of multiple report offset parameters may include operations, features, means, or instructions for transmitting the set of multiple report offset parameters as a single set, where a total number of entries in the single set may be equal to or greater than a total number of entries in a largest time domain resource allocation list configured for any bandwidth part of the set of multiple bandwidth parts configured for the UE.

In some examples of the method, apparatuses, and non-transitory computer-readable medium described herein, the subset of the set of multiple report offset parameters associated with the bandwidth part includes a portion of the single set corresponding to a time domain resource allocation list configured for the bandwidth part.

Some examples of the method, apparatuses, and non-transitory computer-readable medium described herein may further include operations, features, means, or instructions for configuring the second slot for receiving the channel state information report may be further based on the time domain resource allocation list configured for the bandwidth part.

In some examples of the method, apparatuses, and non-transitory computer-readable medium described herein, configuring the second slot for receiving the channel state information report may include operations, features, means, or instructions for configuring a report slot offset from the subset of the set of multiple report slot offsets associated with the bandwidth part.

Some examples of the method, apparatuses, and non-transitory computer-readable medium described herein may further include operations, features, means, or instructions for transmitting a set of multiple uplink power control parameters, where a subset of the set of multiple uplink power control parameters may be associated with the bandwidth part.

In some examples of the method, apparatuses, and non-transitory computer-readable medium described herein, the subset of the set of multiple report offset parameters includes a time domain offset between a physical downlink control channel of the first slot and a physical uplink shared channel of the second slot.

In some examples of the method, apparatuses, and non-transitory computer-readable medium described herein, the message triggering the channel state information report includes a downlink control information message or a media access control control element message.

BRIEF DESCRIPTION OF THE DRAWINGS

FIGS. 14 through 19 show flowcharts illustrating methods that support channel state information reporting on a physical uplink shared channel with multiple uplink bandwidth parts in accordance with aspects of the present disclosure.

DETAILED DESCRIPTION

Figure 1:
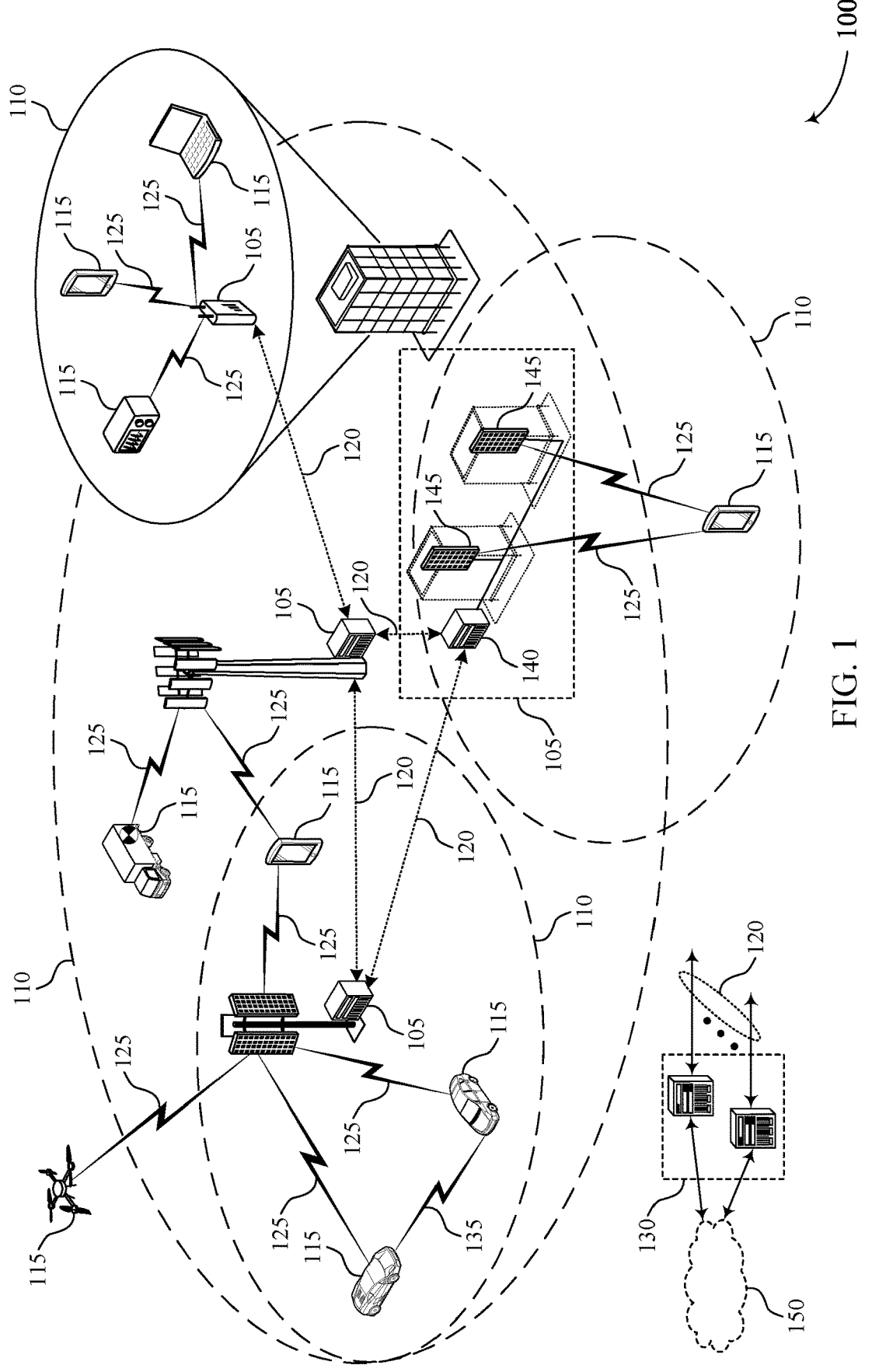
FIG. 1 illustrates an example of a wireless communications system that supports channel state information reporting on a physical uplink shared channel with multiple uplink bandwidth parts in accordance with aspects of the present disclosure.

The present techniques include channel state information (CSI) reporting on a shared channel. Unlike CSI reporting on a physical uplink control channel (PUCCH), the slot offset between a CSI reporting trigger and the CSI report for CSI reporting on a physical uplink shared channel (PUSCH) may be defined by a configured report slot offset list tied to entries in a configured time domain resource allocation list.

Under some prior systems, a UE configured with multiple bandwidth parts receives a separate time domain resource allocation list for each bandwidth part, but not a separate report slot offset list. However, a common set of indexes is used for both the time domain resource allocation list and the report slot offset list. More specifically, a base station may indicate a single index to the UE that is used by the UE to query both a time domain resource allocation list and a report slot offset list and select both a time domain resource allocation parameters and a report slot offset.

The use of a common report slot offset list for all bandwidth parts in connection with a separate time domain resource allocation list specific to each bandwidth part may lead to ambiguity when the number of entries in the common report slot offset list differs from the number of entries in the time domain resource allocation list for the bandwidth part in use (e.g., the current active bandwidth part). Also, even when the number of entries in the common report slot offset list matches the number of entries in the time domain resource allocation list for a given bandwidth part, it may not be beneficial to apply the same list of scheduling offsets for all bandwidth parts, since each bandwidth part may have different characteristics. For example, it may be beneficial to configure some bandwidth parts optimized for power-efficient operation with relatively large scheduling offset values, while other bandwidth parts optimized for high throughput/ low latency may be configured with relatively small scheduling offset values.

The present techniques reduce the ambiguity of which scheduling offset to use for a given BWP and allow for greater diversity in scheduling offsets used by different bandwidth parts. In some examples, the present techniques may include the UE receiving a separate report slot offset list for each bandwidth part, and using the indicated report slot offset list for CSI reporting when a given bandwidth part is active. Additionally, or alternatively, the present techniques may include the UE receiving a single report slot offset list for CSI reporting, where a configuration associated with the single report slot offset list includes a constraint that the number of entries in the report slot offset list is at least as many as the number of entries in the largest time domain resource allocation list for all bandwidth parts configured for that UE. Based on the present techniques, a set of report slot offsets is unambiguously defined for any configured bandwidth part, and the ambiguity is resolved.

Aspects of the subject matter described herein may be implemented to realize one or more advantages. The described techniques may support improvements in system efficiency such that a device may reduce or remove ambiguity that may be associated with CSI reporting (e.g., when the number of entries in the report slot offset list differs from the number of entries in a time domain resource allocation list in a PUSCH configuration for the given UL BWP). Additionally, described techniques may result in avoiding multiple retransmissions and failed transmissions, decreasing system latency, improving the reliability of CSI reporting on a physical uplink shared channel, and improving user experience.

Aspects of the disclosure are initially described in the context of wireless communications systems. Aspects of the disclosure are further illustrated by and described with reference to wireless communications systems, process flows, and block diagrams that relate to channel state information reporting on a physical uplink shared channel. Aspects of the disclosure are further illustrated by and described with reference to apparatus diagrams, system diagrams, and flowcharts that relate to channel state information reporting on a physical uplink shared channel.

Aspects of the disclosure are initially described in the context of wireless communications systems. Aspects of the disclosure are further illustrated by and described with reference to wireless communications systems, process flows, and block diagrams that relate to channel state information reporting on a physical uplink shared channel with multiple uplink bandwidth parts. Aspects of the disclosure are further illustrated by and described with reference to apparatus diagrams, system diagrams, and flowcharts that relate to channel state information reporting on a physical uplink shared channel with multiple uplink bandwidth parts.

FIG. 1 illustrates an example of a wireless communications system 100 that supports channel state information reporting on a physical uplink shared channel with multiple uplink bandwidth parts in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some examples, a UE 115 may be configured by a base station 105 to provide a channel state information (CSI) report to the base station 105. The CSI report may be triggered by downlink control information received from the base station 105 in a first slot. The UE 115 may transmit the CSI report to the base station over a physical uplink shared channel (PUSCH) in a second slot that is offset from the first slot according to a value defined in a report slot offset list. The report slot offset list may us a common indexing scheme as a time domain resource allocation list, which defines possible time domain offsets between a physical downlink control channel (PDCCH) grant and a corresponding PUSCH transmission. As such, the UE 115 may receive an entry index from the base station 105 and use that entry index to select either an applicable time domain resource allocation list entry or a report slot offset list entry, then use the selected entry to respectively determine when to perform a PUSCH transmission or when to transmit a CSI report.

In some cases, the UE may be configured to operate on multiple uplink bandwidth parts, and each bandwidth part may have a separate time domain resource allocation list. The time domain resource allocation lists for different bandwidth parts may be of different sizes and have different numbers of entries. In such cases, the UE may be configured with either a separate report slot offset list for each bandwidth part on which the UE operates, or with a single report slot offset list that has at least as many entries as the largest time domain resource allocation list configured for any of the uplink bandwidth parts on which the UE operates. In this way, the report slot offset between the slot in which a CSI report trigger is received and the slot in which the CSI report is transmitted over the indicated uplink bandwidth part may be unambiguously defined irrespective of the indicated bandwidth part or time domain resource allocation list.

Figure 2:
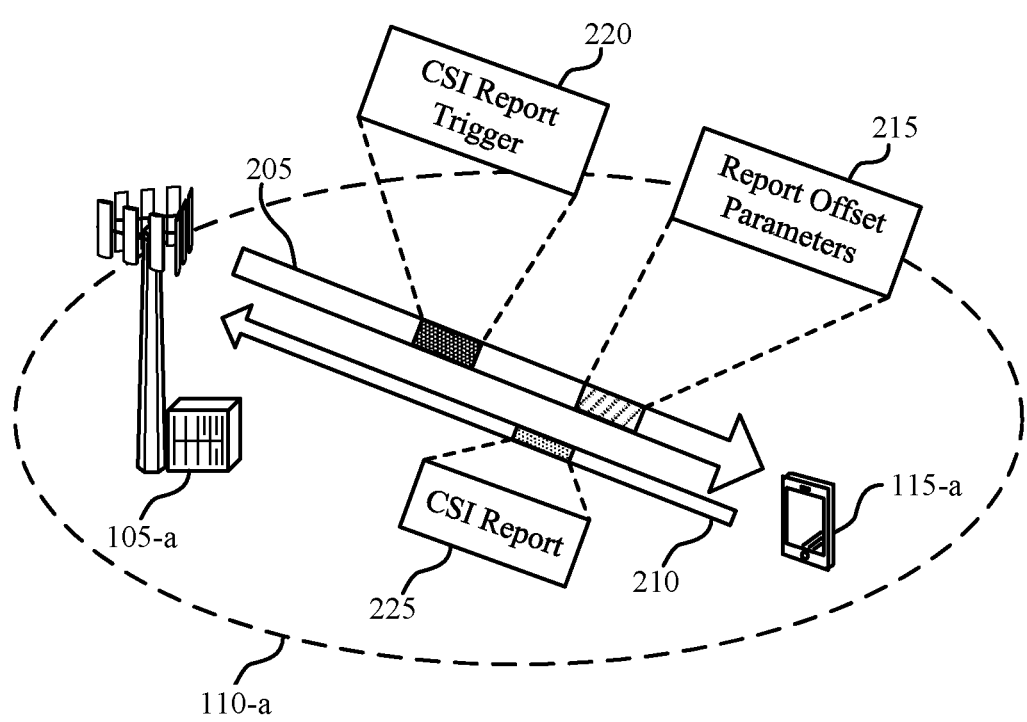
FIG. 2 illustrates an example of a wireless communications system that supports channel state information reporting on a physical uplink shared channel with multiple uplink bandwidth parts in accordance with aspects of the present disclosure.

FIG. 2 illustrates an example of a wireless communications system 200 that supports channel state information reporting on a physical uplink shared channel with multiple uplink bandwidth parts in accordance with aspects of the present disclosure.

As illustrated, wireless communications system 200 may include UE 115-a and base station 105-a, which may be examples of a UE 115 or a base station 105, as described herein with reference to FIG. 1. Base station 105-a may be associated with geographic coverage area 110-a in which communications with one or more UEs (e.g., UE 115-a) is supported. Wireless communications system 200 may include downlink 205 and uplink 210. Base station 105-a may use downlink 205 to convey control and/or data information to UE 115-a. And UE 115-a may use uplink 210 to convey control and/or data information to base station 105-a. In some cases, downlink 205 may use different time and/or frequency resources than uplink 210.

In some examples, UE 115-a may receive a configuration message (e.g., unicast transmission, broadcast transmission, etc.) from a base station 105-a. In some cases, the configuration message may specify or reference a set of report slot offset parameters 215 for use in CSI reports from the UE 115-a to the base station 105-a. This configuration message may be or include a system information transmission in connection with a synchronization system block or a system information block, a radio resource control (RRC) transmission, a media access control (MAC) control element transmission, or some other control transmission.

In some cases, the set of report slot offset parameters 215 may be indicated as a report slot offset list including a number of entries, each entry including at least an entry index and a corresponding time domain slot offset between the slot in which UE 115-a receives uplink control information on a physical downlink control channel to trigger a CSI report, and the slot in which the UE 115-a uses a physical uplink control channel (PUCCH) or physical uplink shared channel (PUSCH) to transmit the CSI report to base station 105-a.

Base station 105-a may trigger a CSI report by transmitting a CSI report trigger 220 to UE 115-a. The CSI report trigger 220 may include a downlink control information or a MAC control element in a first slot. The CSI report trigger 220 may specify an uplink bandwidth part over which a CSI report is to be transmitted by UE 115-a. The CSI report trigger 220 may specify an entry index of the report slot offset list to indicate a report slot offset value for the CSI report trigger 220. Alternatively, the selected entry index may be semi-statically configured (for example, using RRC signaling) or separately indicated to UE 115-a in another way.

The report slot offset list may use a common indexing scheme as a time domain resource allocation list defined for the indicated bandwidth part. In one example, base station 105-a may provide a separate report slot offset list for each supported uplink bandwidth part, such that the number of entries in the report slot offset list for a given uplink bandwidth part matches the number of entries in the time domain resource allocation list for that uplink bandwidth part. In another example, base station 105-a may provide a common report slot offset list for use with all supported uplink bandwidth parts. This common report slot offset list may have a number of entries that is equal to or greater than the number of entries in the largest time domain resource allocation list associated with any of the supported uplink bandwidth parts.

UE 115-a may transmit, via uplink 210, a CSI report 225 to base station 105-a. In some cases, UE 115-a may transmit the CSI report 225 during a second slot. In some cases, UE 115-a may select the second slot for transmitting the CSI report 225 based on the first slot in which the CSI report trigger 220 is transmitted. In some cases, UE 115-a may select the second slot for transmitting the CSI report 225 based on the separate report slot offset list for each supported uplink bandwidth part or the common report slot offset list for all uplink bandwidth parts.

The present techniques may reduce or remove ambiguity that may be associated with CSI reporting (e.g., when the number of entries in the report slot offset list differs from the number of entries in a time domain resource allocation list in a PUSCH configuration for the given UL BWP). Accordingly, the present techniques reduce power consumption and free up processing cycles of one or more devices (e.g., battery-operated devices, a UE 115 of FIG. 1, etc.) by reducing or removing the ambiguity that may be associated with CSI reporting, thus improving user experience of the one or more devices with longer battery life and improved quality of service.

Figure 3:
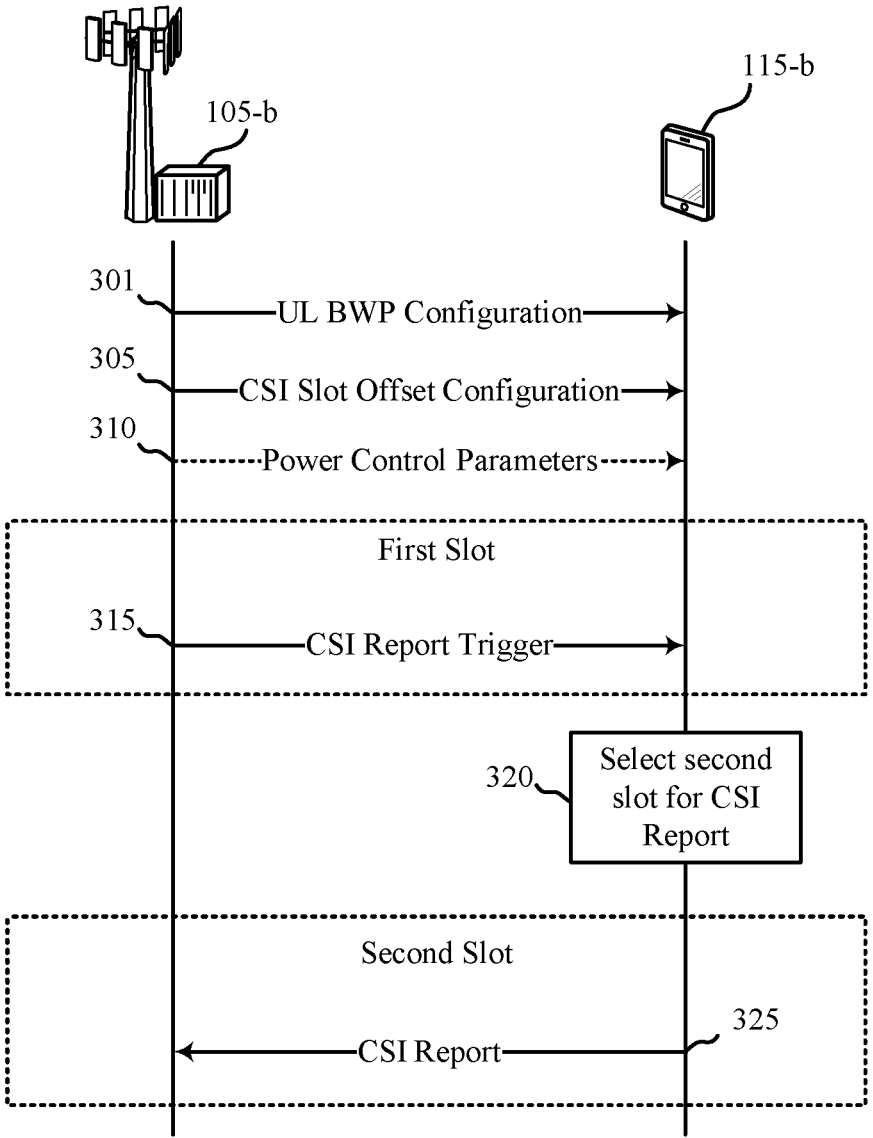
FIG. 3 illustrates an example of a process flow that supports channel state information reporting on a physical uplink shared channel with multiple uplink bandwidth parts in accordance with aspects of the present disclosure.

FIG. 3 illustrates an example of a process flow 300 that supports channel state information reporting on a physical uplink shared channel with multiple uplink bandwidth parts in accordance with aspects of the present disclosure.

At 301, base station 105-*b* may configure UE 115-*b* with multiple uplink bandwidth parts. This configuration may occur using a RRC message, a MAC CE message, system information blocks, or some other control message or signaling. Each configured uplink bandwidth part may be associated with a separate time domain resource allocation list, and the time domain resource allocation lists for different bandwidth parts may be of different sizes (e.g., may have different numbers of entries).

At 305, base station 105-*b* may transmit a configuration of report slot offset parameters (e.g., one or more sets of report slot offset parameters) to UE 115-*b*. In some cases, the report slot offset parameters may be transmitted in a RRC message, a MAC CE message, as system information, or in some other control message or signaling. In some cases, a subset of the report slot offset parameters may be associated with a bandwidth part of one or more bandwidth parts configured for UE 115-*b* by base station 105-*b*. In some cases, a first set of report slot offset parameters may be specific to a first bandwidth part configured for the UE. In some cases, a second set of report slot offset parameters may be specific to a second bandwidth part configured for the UE, etc.

For example, base station 105-*b* may configure (e.g., transmit to UE 115-*b*) separate report slot offset lists for separate uplink bandwidth parts on which UE 115-*b* operates. Alternatively, base station 105-*b* may configure (e.g., transmit to UE 115-*b*) a single report slot offset list for all uplink bandwidth parts on which UE 115-*b* operates, such that the number of entries in the report slot offset list is equal to or greater than the number of entries in the largest time domain resource allocation list associated with any of the uplink bandwidth parts on which UE 115-*b* operates. In either case, a report slot offset for CSI reporting may be unambiguously defined for any combination of uplink bandwidth part and time domain resource allocation list entry.

At 310, base station 105-*b* may transmit one or more uplink power control parameters to UE 115-*b*. In some cases, a subset of the uplink power control parameters may be associated with the bandwidth part. In some cases, a first set of uplink power control parameters may be associated with a first bandwidth part, a second set of uplink power control parameters may be associated with a second bandwidth part, etc.

At 315, base station 105-*b* may transmit a message that triggers a CSI report by UE 115-*b* on a physical uplink shared channel using a specific associated bandwidth part. In some cases, the message may be transmitted during a first slot. In some cases, the message triggering the channel state information report may include a downlink control information message or a media access control (MAC) control element message.

At 320, UE 115-*b* may select a second slot for transmitting the channel state information report based on the first slot and the subset of report slot offset parameters associated with the bandwidth part. For example, UE 115-*b* may identify an applicable time domain resource allocation list entry for the bandwidth part and use the time domain resource allocation list entry to determine a report slot offset for the CSI report from either a configured report slot offset list specific to the bandwidth part or a single report slot offset list having a report slot offset specified for any possible time domain resource allocation list entry on the bandwidth part.

At 325, UE 115-*b* may transmit, during the second slot, the channel state information report to base station 105-*b*. In some cases, the CSI report may include an aperiodic CSI report or a semi-persistent CSI report, or both.

Figure 4:
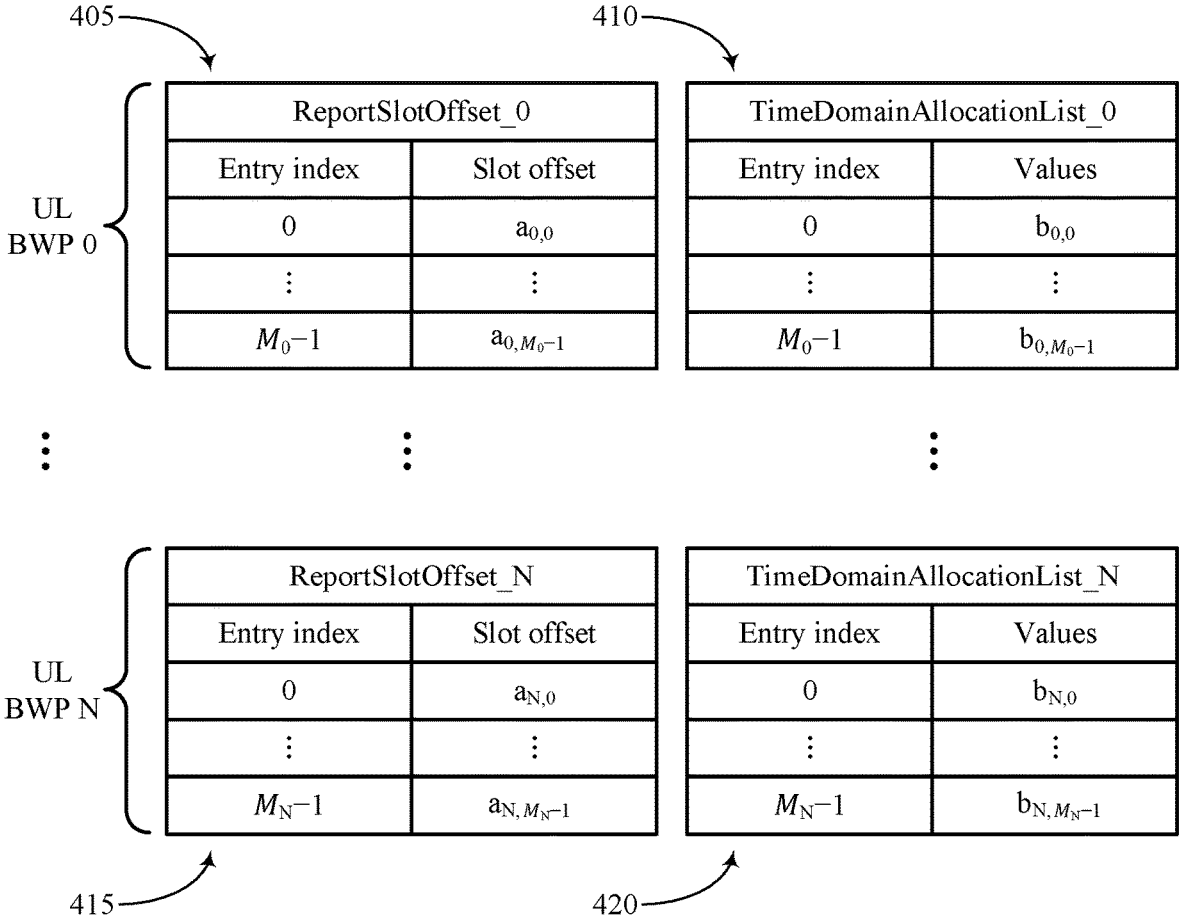
FIG. 4 illustrates an example report slot offset scheme in which report slot offset lists and time domain resource allocation lists are separately configured for each bandwidth part supported by a UE in accordance with aspects of the present disclosure.

FIG. 4 illustrates an example offset scheme 400 in which report slot offset lists and time domain resource allocation lists are separately configured for each bandwidth part supported by a UE in accordance with aspects of the present disclosure.

As shown, each uplink bandwidth part supported by a UE (such as BWP 0 to BWP N, where N is a positive integer) may be associated with a separate report slot offset table for use in determining a report slot offset for CSI reporting, as indicated above. In some examples, N may range from 1 to 32 (e.g., 1 to 32 bandwidth parts). In some cases, each uplink bandwidth part supported by the UE also may be associated with a separate time domain resource allocation list (e.g., an RRC parameter TimeDomainAllocationList), which defines the offset between a downlink grant received over a physical downlink control channel (PDCCH) and a corresponding physical downlink shared channel (PDSCH) data transmission.

As shown, the report slot offset list and the time domain resource allocation list for each uplink bandwidth part use a common indexing scheme and have the same number of entries. As shown, both a first report slot offset list 405 and a first time domain resource allocation list 410 may correspond to a first bandwidth part (BWP 0), and each may be configured with $M_0$ entries. Similarly, an Nth report slot offset list 415 and an Nth time domain resource allocation list 420 may correspond to an N+1th bandwidth part (BWP N) and each may be configured with MN entries.

In some examples, a base station may transmit a configuration of report slot offset parameters to a UE by providing report slot offset lists 405 to 415 to the UE. In some cases, the configuration of report slot offset parameters may indicate that the first bandwidth part corresponds to first report slot offset list 405 and first time domain resource allocation list 410, that the Nth bandwidth part corresponds to the Nth report slot offset list 415 and the Nth time domain resource allocation list 420, etc.

In some examples, the configuration of report slot offset parameters by the base station may indicate the total number of entries of first report slot offset list 405 and the total number of entries of first time domain resource allocation list 410. As shown, the total number of entries of first report slot offset list 405 is configured to match the total number of entries of first time domain resource allocation list 410. Thus, if the first time domain resource allocation list 410 for the first UL bandwidth part is configured with 4 entries (e.g., entry index 0, entry index 1, entry index 2, entry index 3), then first report slot offset list 405 for the first UL bandwidth part may be configured to have 4 entries. Similarly, the configuration of report slot offset parameters may indicate the total number of entries of the Nth report slot offset list 415 and the total number of entries of the Nth time domain resource allocation list 420, where the total number of entries of the Nth report slot offset list 415 is configured to match the total number of entries of the Nth time domain resource allocation list 420.

In some examples, base station 105-*b* may transmit uplink power control parameters associated with CSI reporting. In some cases, a subset of the uplink power control parameters may be associated with a bandwidth part. In some cases, along with first report slot offset list 405 and first time domain resource allocation list 410, a first set of transmit uplink power control parameters may be associated with the first bandwidth part. Similarly, along with Nth report slot offset list 415 and Nth time domain resource allocation list 420, an Nth set of transmit uplink power control parameters may be associated with the Nth bandwidth part, etc. Accordingly, N sets of transmit uplink power control parameters may correspond, respectively, to the N bandwidth parts.

Figure 5:
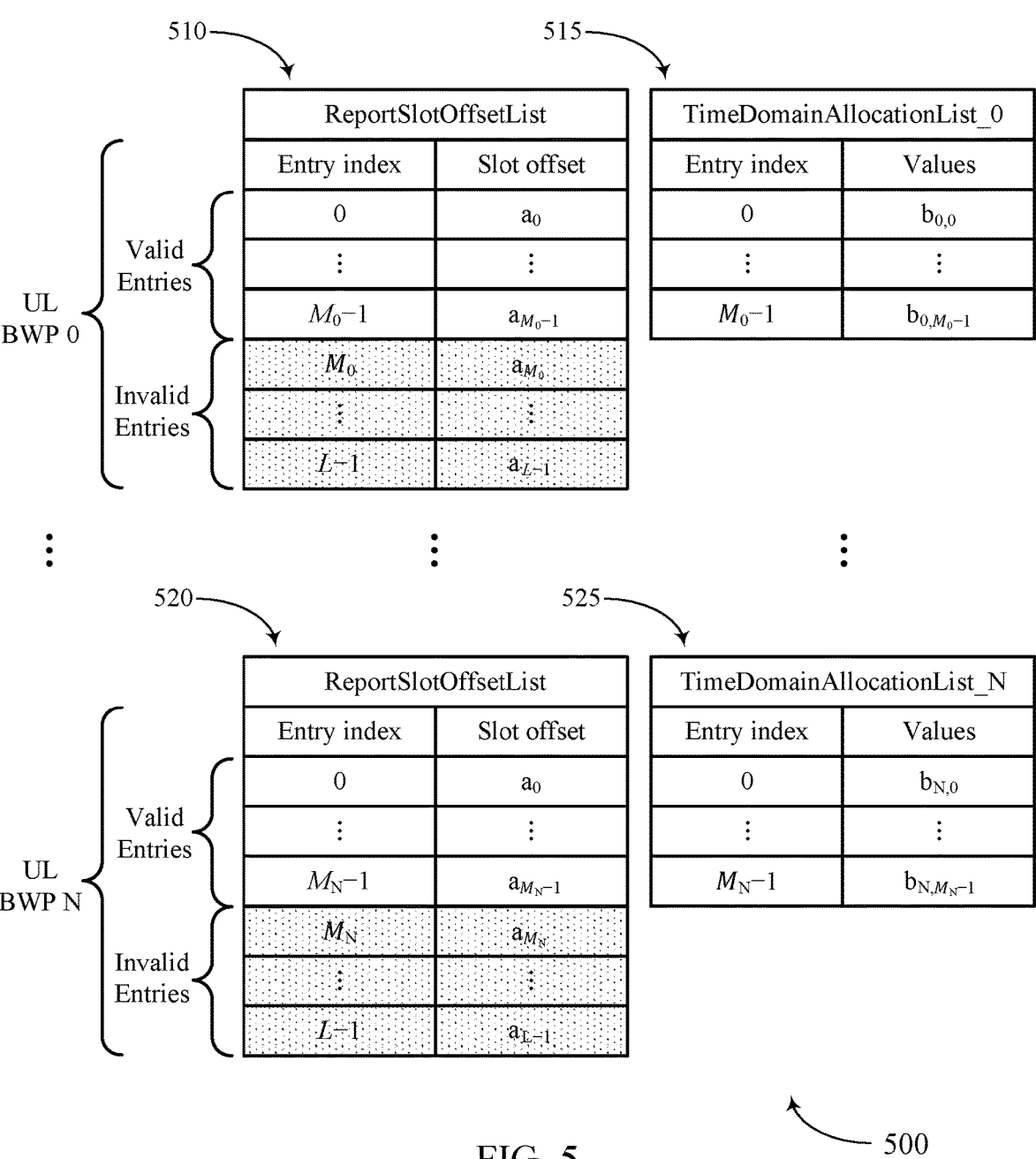
FIG. 5 illustrates an example report slot offset scheme in which a common report slot offset list is used for multiple bandwidth parts supported by a UE in accordance with aspects of the present disclosure in accordance with aspects of the present disclosure.

FIG. 5 illustrates an example an example report slot offset scheme 500 in which a common report slot offset list is used for multiple bandwidth parts supported by a UE in accordance with aspects of the present disclosure.

In the illustrated example report slot offset scheme 500, may include a report slot offset list. In some examples, a base station (e.g., a base station 105 described herein) may configure N bandwidth parts for a UE (e.g., a UE 115 described herein). In the illustrated example, the base station may configure N time domain resource allocation lists for the N bandwidth parts, and one report slot offset list for the N bandwidth parts. Thus, one report slot offset list and N time domain resource allocation lists may correspond to the N bandwidth parts, where N is a positive integer that is based on a total number of bandwidth parts configured for the UE. In some examples, N may range from 1 to 32.

As shown, block diagram 500 may include report slot offset list 505 that corresponds to each of the N bandwidth parts. In some cases, report slot offset list 505 may include L entries, where a first entry index of report slot offset list 505 corresponds to a report slot offset of $a_0$ and the Lth entry index of report slot offset list 505 corresponds to a report slot offset of $a_{L-1}$.

As shown, block diagram 500 may include N time domain resource allocation lists, where the N time domain resource allocation lists include first time domain resource allocation list 515 up to Nth time domain resource allocation list 525. As shown, first time domain resource allocation list 515 may include $M_0$ entries. In some cases, a first entry index of first time domain resource allocation list 515 corresponds to a report slot offset of $b_{0,0}$ and the $M_0$th entry index of report slot offset list 505 corresponds to a report slot offset of $b_{0,M0-1}$.

In some examples, the same report slot offset list 505 may be used for each of the N bandwidth parts. Accordingly, a UE may use any one of the N bandwidth parts in association with a CSI report. In any case, the UE may use an instance (e.g., a modified instance) of report slot offset list 505 in association with a CSI report. As shown, the N bandwidth parts may include a first instance of the report slot offset list 510 for a first bandwidth part of the N bandwidth parts, up to an Nth instance of the report slot offset list 520 for the Nth bandwidth part of the N bandwidth parts.

In some examples, the number of entries of report slot offset list 505 may not match the number of entries in each of the N time domain resource allocation lists. In some cases, when the number of entries of report slot offset list 505 does not match the number of entries in one of the N time domain resource allocation lists (e.g., the number of entries of report slot offset list 505 exceeds the number of entries in one of the N time domain resource allocation lists), then the number of entries of report slot offset list 505 may be trimmed (e.g., one or more entries of report slot offset list 505 may be indicated as invalid). In some cases, when the number of entries of report slot offset list 505 matches the number of entries in one of the N time domain resource allocation lists, then all of the entries of report slot offset list 505 may be available (e.g., all entries indicated as valid).

In the illustrated example, the number of entries in the first instance of the report slot offset list 510 may not match the number of entries in the first time domain resource allocation list 515. As shown, first instance of the report slot offset list 510 may include L entries, while first time domain resource allocation list 515 may include $M_0$ entries, where L does not match $M_0$ (e.g., L is greater than $M_0$). Accordingly, to avoid ambiguity that may result from the mismatch in the number of respective entries, a UE may indicate a valid set of entries out of the L total number of entries (e.g., the first $M_0$ entries, or any contiguous segment of $M_0$ entries out of the L total number of entries, or two or more non-contiguous segments of entries that add up to $M_0$ entries). In some cases, the UE may indicate an invalid set of entries among the L total number of entries.

In the illustrated example, a UE may indicate the first $M_0$ entries as valid entries and the remaining entries as invalid entries. By indicating one or more entries are invalid, the number of valid entries of the first instance of the report slot offset list 510 may be made to match the total number of entries of first time domain resource allocation list 515. Accordingly, any potential ambiguity that could result from a mismatch in the respective entries may be avoided.

Figure 6:
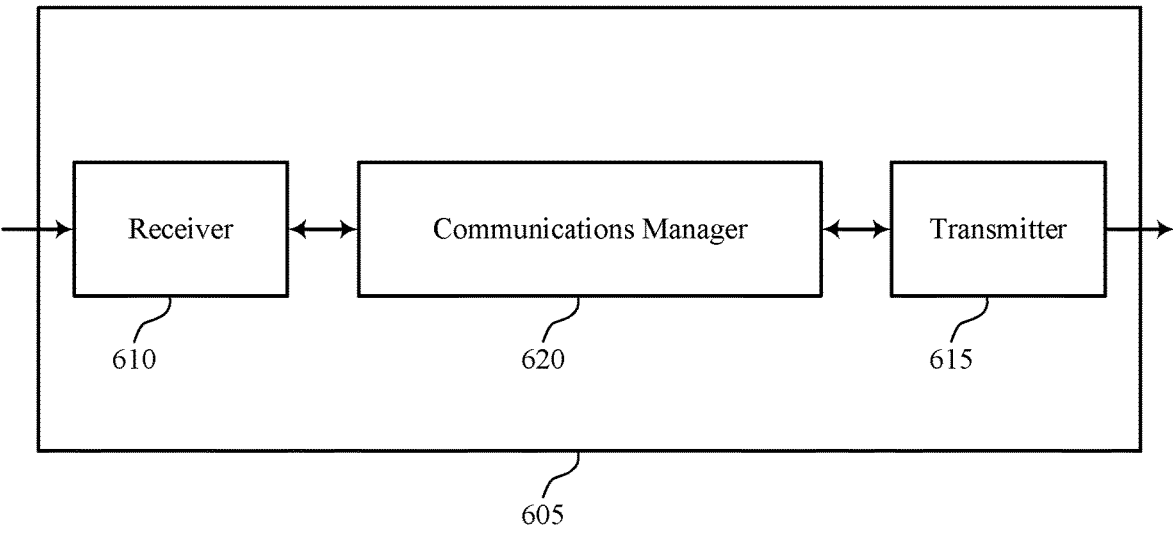
FIGS. 6 and 7 show block diagrams of devices that support channel state information reporting on a physical uplink shared channel with multiple uplink bandwidth parts in accordance with aspects of the present disclosure.

FIG. 6 shows a block diagram 600 of a device 605 that supports channel state information reporting on a physical uplink shared channel with multiple uplink bandwidth parts in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to channel state information reporting on a physical uplink shared channel with multiple uplink bandwidth parts). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to channel state information reporting on a physical uplink shared channel with multiple uplink bandwidth parts). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of channel state information reporting on a physical uplink shared channel with multiple uplink bandwidth parts as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for receiving a configuration of a set of multiple report slot offset parameters, where a subset of the set of multiple report slot offset parameters is associated with a bandwidth part of a set of multiple bandwidth parts configured for the UE. The communications manager 620 may be configured as or otherwise support a means for receiving, during a first slot, a message triggering a channel state information report on a physical uplink shared channel of (e.g., using) the bandwidth part. The communications manager 620 may be configured as or otherwise support a means for selecting a second slot for transmitting the channel state information report based on the first slot and the subset of the set of multiple report slot offset parameters associated with the bandwidth part. The communications manager 620 may be configured as or otherwise support a means for transmitting, during the second slot, the channel state information report.

Figure 7:
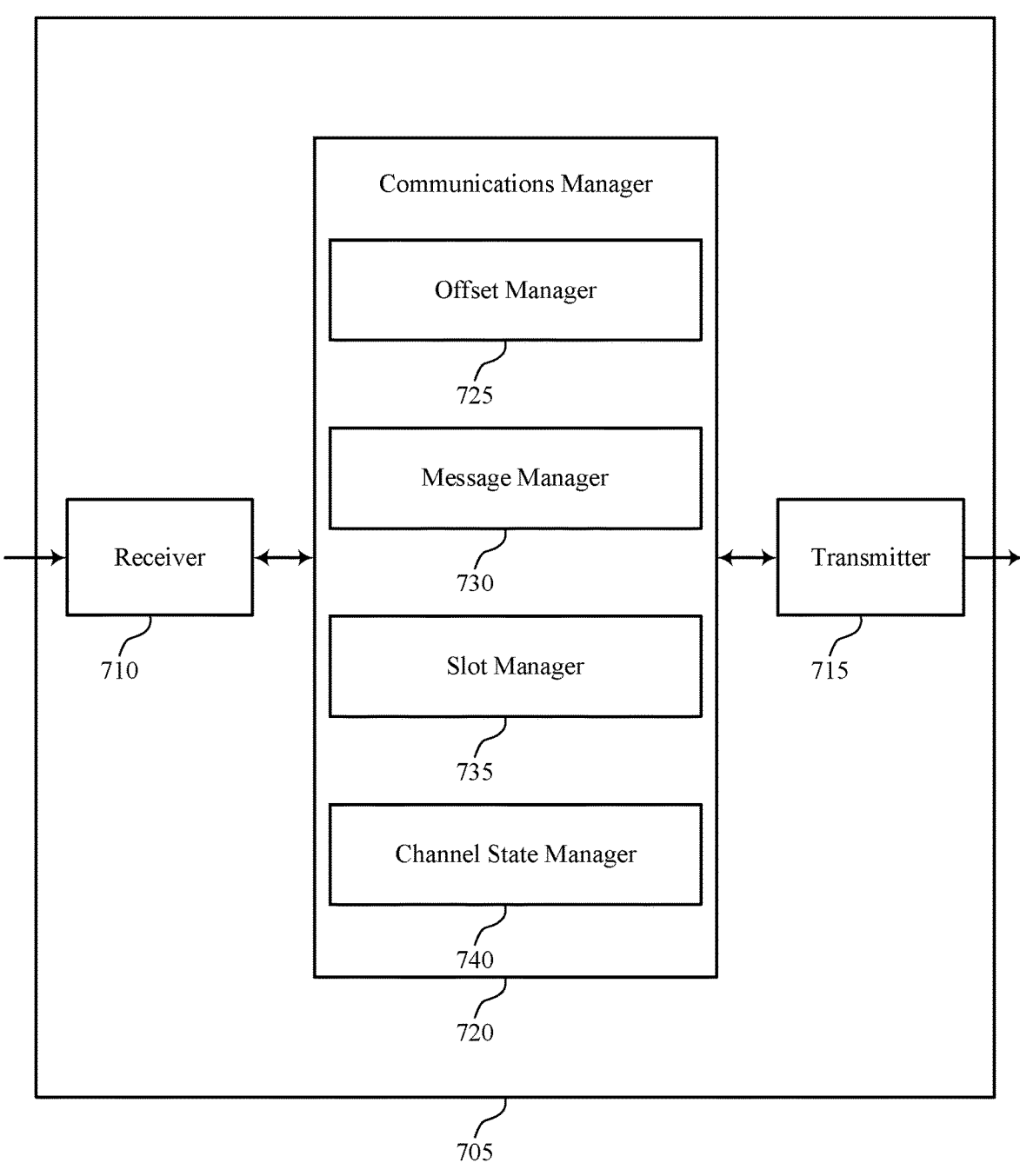

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reducing or removing ambiguity that may be associated with CSI reporting (e.g., when the number of offset entries in a PUSCH configuration for a given UL BWP differs from the number of entries in a time domain resource allocation list for the given UL BWP). By reducing or removing the ambiguity, processing that would have been used to resolve the ambiguity may be conserved for other uses. Accordingly, the present techniques increase efficient utilization of communication resources, as well as reduce power consumption and free up processing cycles of device 605 by reducing or removing the ambiguity that may be associated with CSI reporting, thus improving user experience of the one or more devices with longer battery life and improved quality of service FIG. 7 shows a block diagram 700 of a device 705 that supports channel state information reporting on a physical uplink shared channel with multiple uplink bandwidth parts in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to channel state information reporting on a physical uplink shared channel with multiple uplink bandwidth parts). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to channel state information reporting on a physical uplink shared channel with multiple uplink bandwidth parts). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of channel state information reporting on a physical uplink shared channel with multiple uplink bandwidth parts as described herein. For example, the communications manager 720 may include an offset manager 725, a message manager 730, a slot manager 735, a channel state manager 740, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The offset manager 725 may be configured as or otherwise support a means for receiving a configuration of a set of multiple report slot offset parameters, where a subset of the set of multiple report slot offset parameters is associated with a bandwidth part of a set of multiple bandwidth parts configured for the UE. The message manager 730 may be configured as or otherwise support a means for receiving, during a first slot, a message triggering a channel state information report on a physical uplink shared channel of the bandwidth part. The slot manager 735 may be configured as or otherwise support a means for selecting a second slot for transmitting the channel state information report based on the first slot and the subset of the set of multiple report slot offset parameters associated with the bandwidth part. The channel state manager 740 may be configured as or otherwise support a means for transmitting, during the second slot, the channel state information report.

Figure 8:
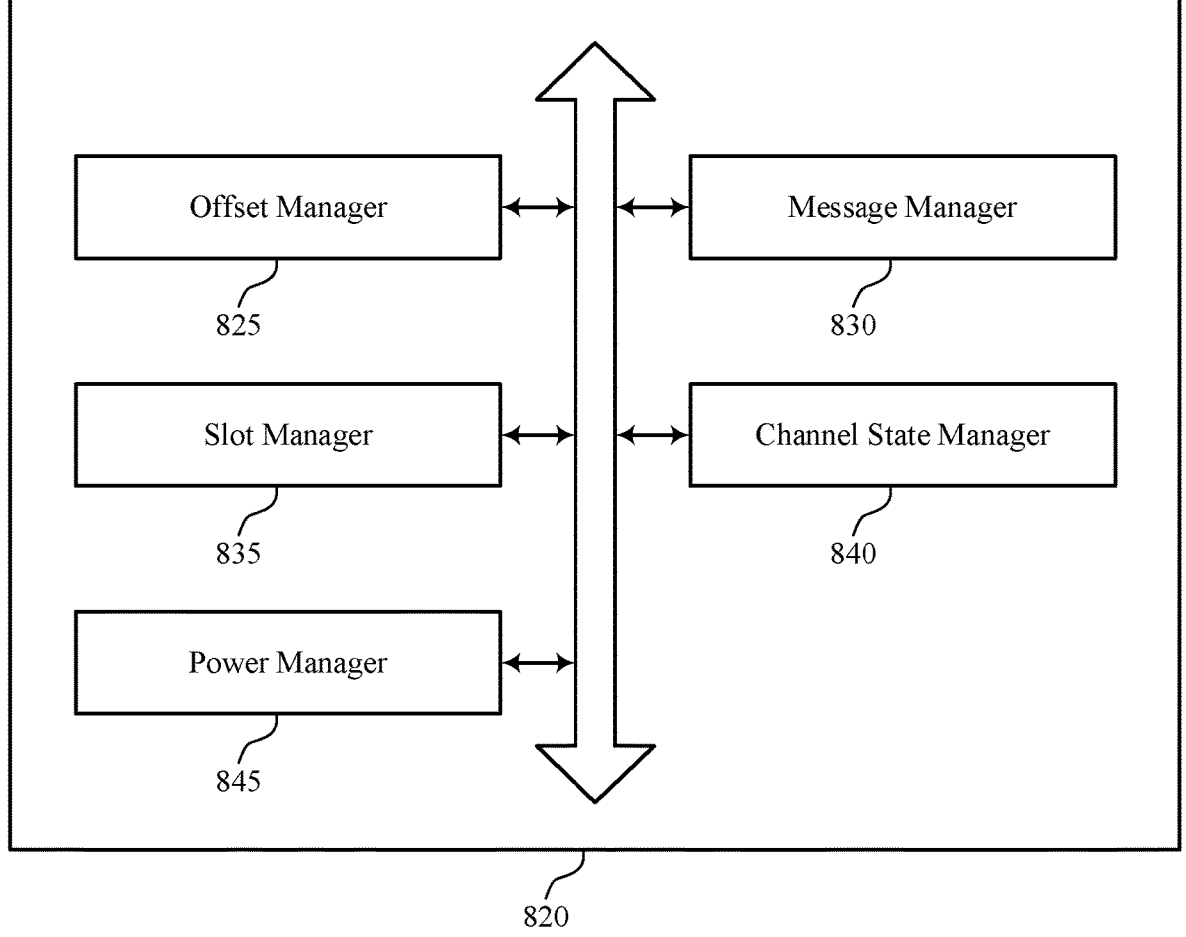
FIG. 8 shows a block diagram of a communications manager that supports channel state information reporting on a physical uplink shared channel with multiple uplink bandwidth parts in accordance with aspects of the present disclosure.

FIG. 8 shows a block diagram 800 of a communications manager 820 that supports channel state information reporting on a physical uplink shared channel with multiple uplink bandwidth parts in accordance with aspects of the present disclosure. The communications manager 820 may be an example of aspects of a communications manager 620, a communications manager 720, or both, as described herein. The communications manager 820, or various components thereof, may be an example of means for performing various aspects of channel state information reporting on a physical uplink shared channel with multiple uplink bandwidth parts as described herein. For example, the communications manager 820 may include an offset manager 825, a message manager 830, a slot manager 835, a channel state manager 840, a power manager 845, or any combination thereof. Each of these components may communicate, directly or indirectly, with one another (e.g., via one or more buses).

The communications manager 820 may support wireless communication at a UE in accordance with examples as disclosed herein. The offset manager 825 may be configured as or otherwise support a means for receiving a configuration of a set of multiple report slot offset parameters, where a subset of the set of multiple report slot offset parameters is associated with a bandwidth part of a set of multiple bandwidth parts configured for the UE. The message manager 830 may be configured as or otherwise support a means for receiving, during a first slot, a message triggering a channel state information report on a physical uplink shared channel of the bandwidth part. The slot manager 835 may be configured as or otherwise support a means for selecting a second slot for transmitting the channel state information report based on the first slot and the subset of the set of multiple report slot offset parameters associated with the bandwidth part. The channel state manager 840 may be configured as or otherwise support a means for transmitting, during the second slot, the channel state information report.

In some examples, to support receiving the configuration of the set of multiple report slot offset parameters, the offset manager 825 may be configured as or otherwise support a means for receiving a separate set of report slot offset parameters for each bandwidth part of the set of multiple bandwidth parts configured for the UE.

In some examples, to support receiving the configuration of the set of multiple report slot offset parameters, the offset manager 825 may be configured as or otherwise support a means for receiving the set of multiple report slot offset parameters as a single set, where a total number of entries in the single set is equal to or greater than a total number of entries in a largest time domain resource allocation list configured for any bandwidth part of the set of multiple bandwidth parts configured for the UE.

In some examples, the subset of the set of multiple report slot offset parameters associated with the bandwidth part includes a portion of the single set with a same number of entries as a time domain resource allocation list configured for the bandwidth part.

In some examples, to support selecting the second slot for transmitting the channel state information report, the slot manager 835 may be configured as or otherwise support a means for determining a resource allocation for the second slot, where determining the resource allocation for the second slot is based on the time domain resource allocation list configured for the bandwidth part.

In some examples, to support selecting the second slot for transmitting the channel state information report, the slot manager 835 may be configured as or otherwise support a means for selecting a report slot offset from the subset of the set of multiple report slot offsets associated with the bandwidth part.

In some examples, the power manager 845 may be configured as or otherwise support a means for receiving a set of multiple uplink power control parameters, where a subset of the set of multiple uplink power control parameters is associated with the bandwidth part.

In some examples, the power manager 845 may be configured as or otherwise support a means for selecting an uplink power control parameter of the subset of the set of multiple uplink power control parameters based on the bandwidth part. In some examples, a transmit power of the channel state information report is based on the selected uplink power control parameter.

In some examples, to support selecting the second slot for transmitting the channel state information report, the slot manager 835 may be configured as or otherwise support a means for performing a measurement of a channel state information reference signal, where the channel state information report is based on the measurement.

In some examples, the subset of the set of multiple report slot offset parameters includes a time domain offset between a physical downlink control channel of the first slot and a physical uplink shared channel of the second slot.

In some examples, the message triggering the channel state information report includes a downlink control information message or a media access control (MAC) control element message.

Figure 9:
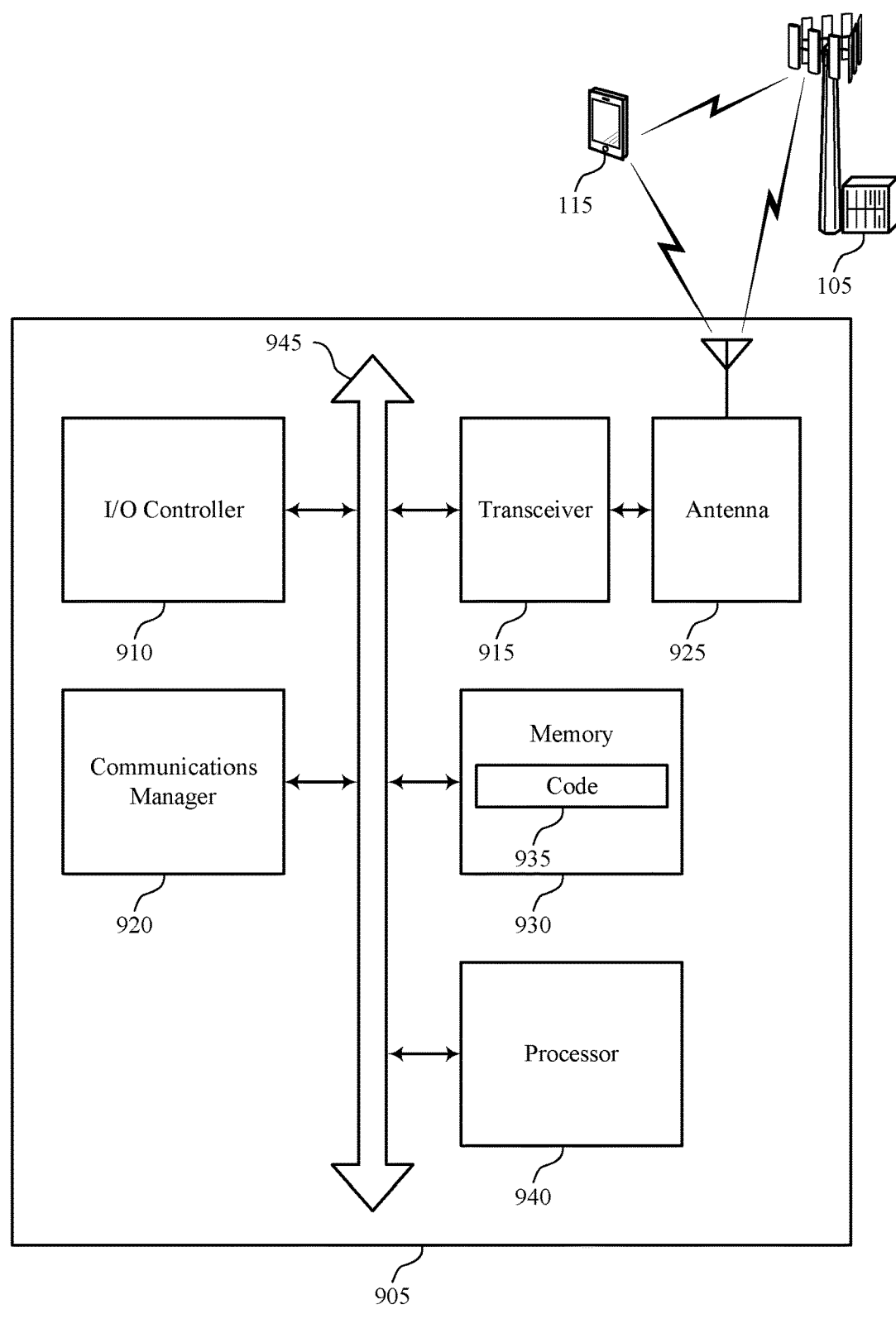
FIG. 9 shows a diagram of a system including a device that supports channel state information reporting on a physical uplink shared channel with multiple uplink bandwidth parts in accordance with aspects of the present disclosure.

FIG. 9 shows a diagram of a system 900 including a device 905 that supports channel state information reporting on a physical uplink shared channel with multiple uplink bandwidth parts in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting channel state information reporting on a physical uplink shared channel with multiple uplink bandwidth parts). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving a configuration of a set of multiple report slot offset parameters, where a subset of the set of multiple report slot offset parameters is associated with a bandwidth part of a set of multiple bandwidth parts configured for the UE. The communications manager 920 may be configured as or otherwise support a means for receiving, during a first slot, a message triggering a channel state information report on a physical uplink shared channel of the bandwidth part. The communications manager 920 may be configured as or otherwise support a means for selecting a second slot for transmitting the channel state information report based on the first slot and the subset of the set of multiple report slot offset parameters associated with the bandwidth part. The communications manager 920 may be configured as or otherwise support a means for transmitting, during the second slot, the channel state information report.

By including or configuring the communications manager 920 in accordance with examples as described herein, the device 905 may support techniques for reducing or removing ambiguity that may be associated with CSI reporting (e.g., when the number of offset entries in a PUSCH configuration for a given UL BWP differs from the number of entries in a time domain resource allocation list for the given UL BWP). By reducing or removing the ambiguity, processing that would have been used to resolve the ambiguity may be reserved for other uses. Accordingly, the present techniques reduce power consumption and free up processing cycles of device 905 by reducing or removing the ambiguity that may be associated with CSI reporting, thus improving communication reliability, reducing associated latency, improving user experience related to reduced processing, reducing power consumption, improving coordination between devices, increasing battery life, and improving utilization of processing capability of device 905.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of channel state information reporting on a physical uplink shared channel with multiple uplink bandwidth parts as described herein, or the processor 940 and the memory 930 may be otherwise configured to perform or support such operations.

Figure 10:
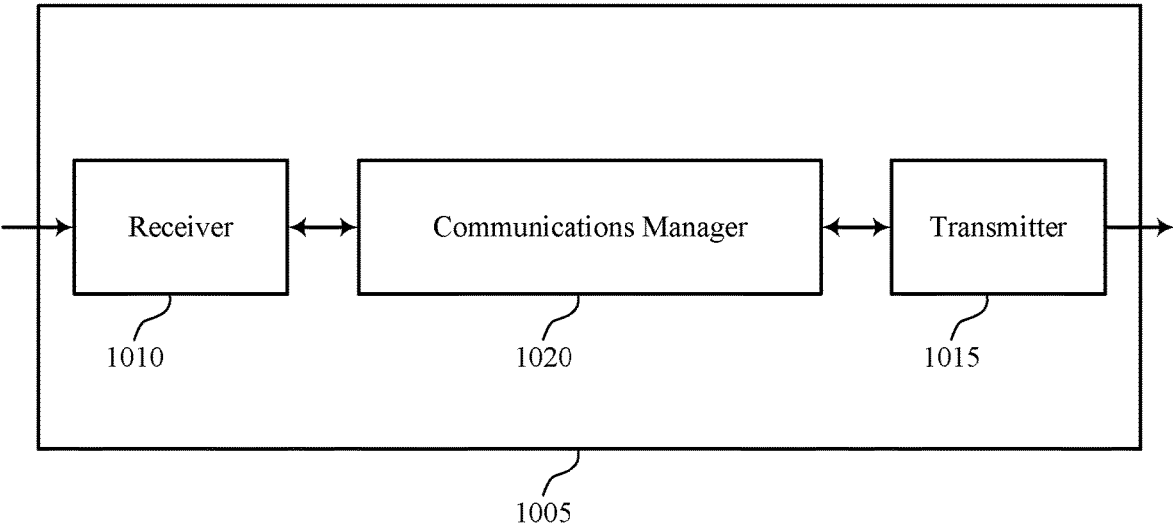
FIGS. 10 and 11 show block diagrams of devices that support channel state information reporting on a physical uplink shared channel with multiple uplink bandwidth parts in accordance with aspects of the present disclosure.

FIG. 10 shows a block diagram 1000 of a device 1005 that supports channel state information reporting on a physical uplink shared channel with multiple uplink bandwidth parts in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to channel state information reporting on a physical uplink shared channel with multiple uplink bandwidth parts). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to channel state information reporting on a physical uplink shared channel with multiple uplink bandwidth parts). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of channel state information reporting on a physical uplink shared channel with multiple uplink bandwidth parts as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. For example, the communications manager 1020 may be configured as or otherwise support a means for transmitting a configuration of a set of multiple report slot offset parameters, where a subset of the set of multiple report slot offset parameters is associated with a bandwidth part of a set of multiple bandwidth parts configured for a UE. The communications manager 1020 may be configured as or otherwise support a means for transmitting, during a first slot, a message triggering a channel state information report on a physical uplink shared channel of the bandwidth part. The communications manager 1020 may be configured as or otherwise support a means for configuring a second slot for receiving the channel state information report based on the first slot and the subset of the set of multiple report slot offset parameters associated with the bandwidth part. The communications manager 1020 may be configured as or otherwise support a means for receiving, during the second slot, the channel state information report.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for reducing or removing ambiguity that may be associated with CSI reporting (e.g., when the number of offset entries in a PUSCH configuration for a given UL BWP differs from the number of entries in a time domain resource allocation list for the given UL BWP). By reducing or removing the ambiguity, processing that would have been used to resolve the ambiguity may be reserved for other uses of device 1005. Accordingly, the present techniques reduce power consumption and free up processing cycles of device 1005 by reducing or removing the ambiguity that may be associated with CSI reporting, thus reducing processing, reducing power consumption, and providing more efficient utilization of communication resources.

Figure 11:
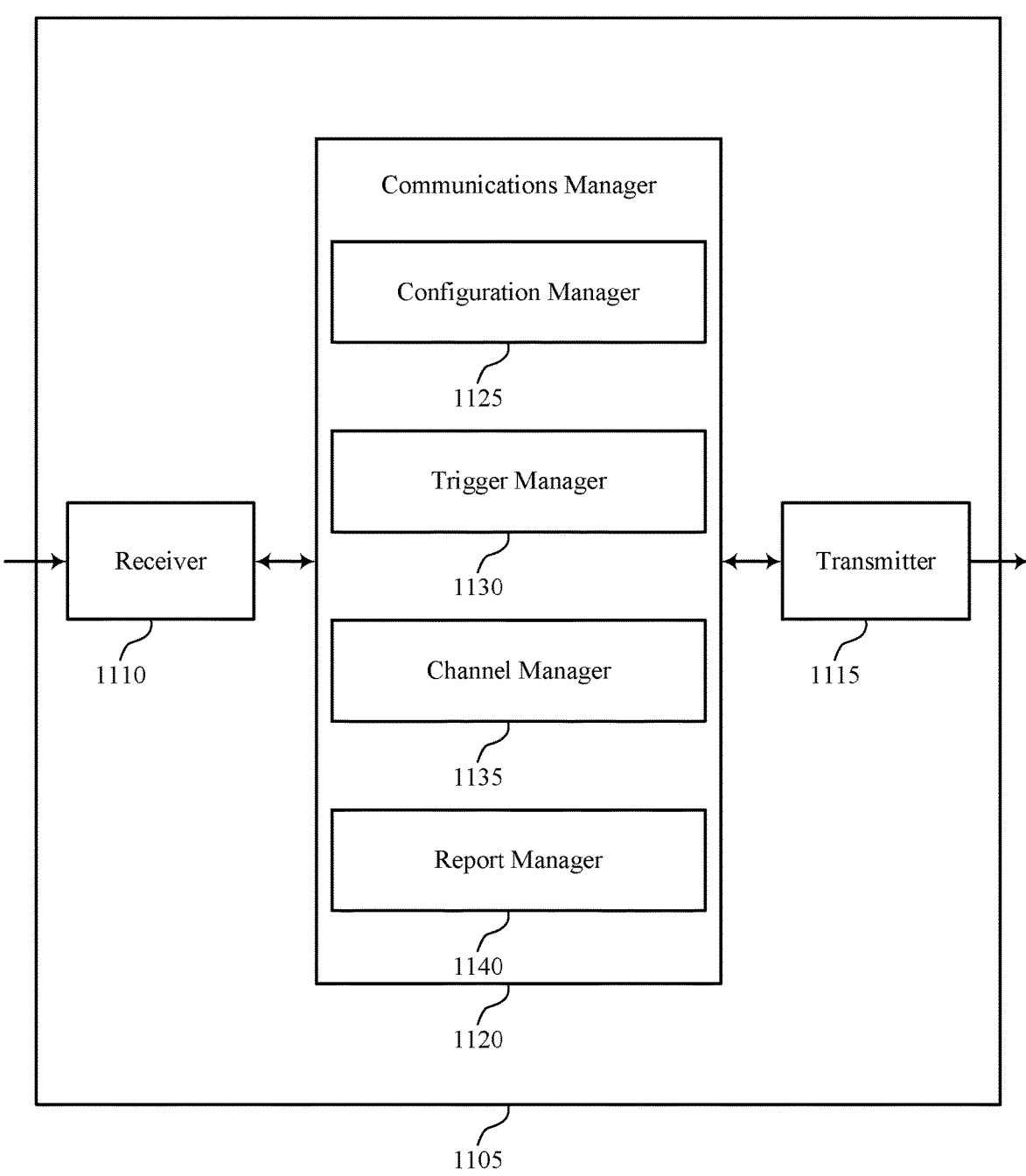

FIG. 11 shows a block diagram 1100 of a device 1105 that supports channel state information reporting on a physical uplink shared channel with multiple uplink bandwidth parts in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to channel state information reporting on a physical uplink shared channel with multiple uplink bandwidth parts). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to channel state information reporting on a physical uplink shared channel with multiple uplink bandwidth parts). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of channel state information reporting on a physical uplink shared channel with multiple uplink bandwidth parts as described herein. For example, the communications manager 1120 may include a configuration manager 1125, a trigger manager 1130, a channel manager 1135, a report manager 1140, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. The configuration manager 1125 may be configured as or otherwise support a means for transmitting a configuration of a set of multiple report slot offset parameters, where a subset of the set of multiple report slot offset parameters is associated with a bandwidth part of a set of multiple bandwidth parts configured for a UE. The trigger manager 1130 may be configured as or otherwise support a means for transmitting, during a first slot, a message triggering a channel state information report on a physical uplink shared channel of the bandwidth part. The channel manager 1135 may be configured as or otherwise support a means for configuring a second slot for receiving the channel state information report based on the first slot and the subset of the set of multiple report slot offset parameters associated with the bandwidth part. The report manager 1140 may be configured as or otherwise support a means for receiving, during the second slot, the channel state information report.

Figure 12:
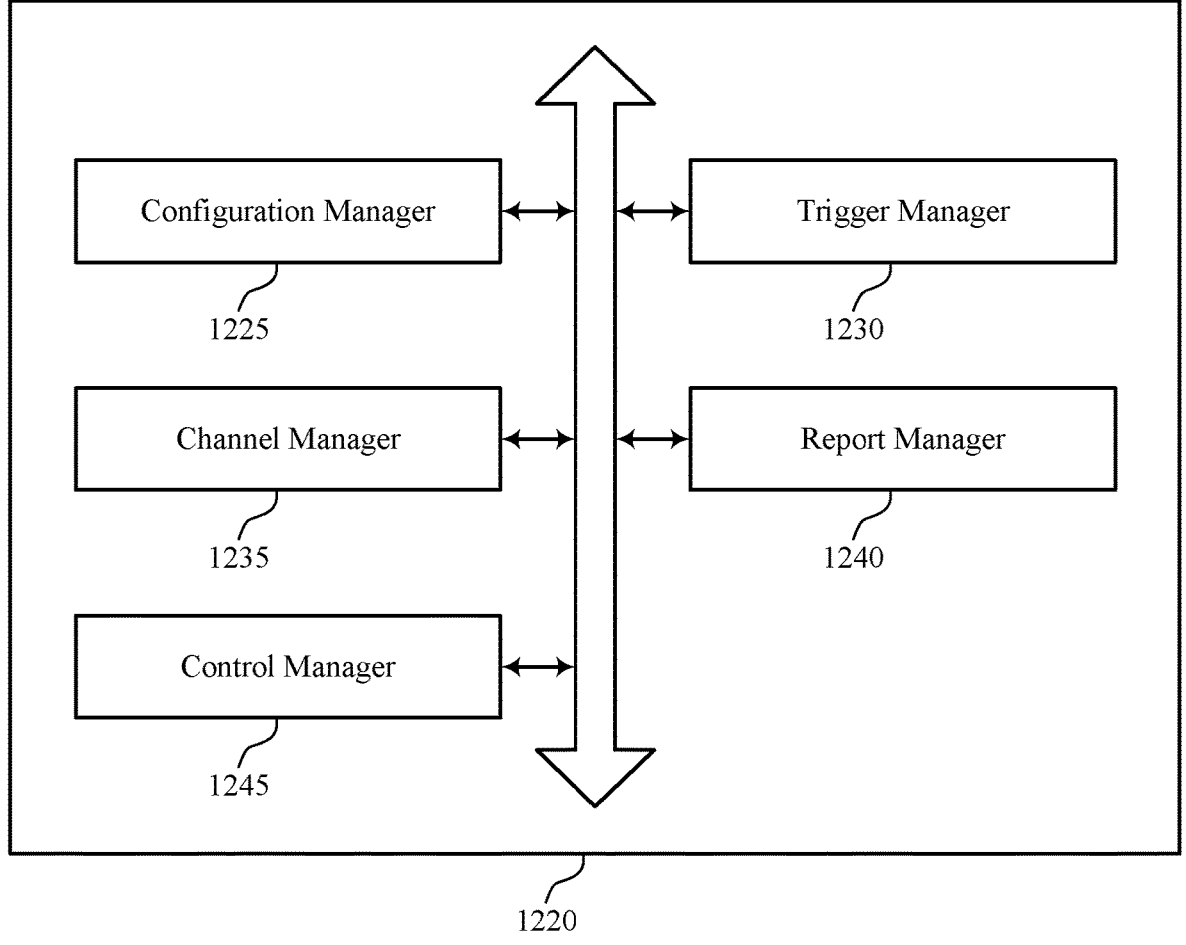
FIG. 12 shows a block diagram of a communications manager that supports channel state information reporting on a physical uplink shared channel with multiple uplink bandwidth parts in accordance with aspects of the present disclosure.

FIG. 12 shows a block diagram 1200 of a communications manager 1220 that supports channel state information reporting on a physical uplink shared channel with multiple uplink bandwidth parts in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of channel state information reporting on a physical uplink shared channel with multiple uplink bandwidth parts as described herein. For example, the communications manager 1220 may include a configuration manager 1225, a trigger manager 1230, a channel manager 1235, a report manager 1240, a control manager 1245, or any combination thereof. Each of these components may communicate, directly or indirectly, with one another (e.g., via one or more buses).

The communications manager 1220 may support wireless communication at a base station in accordance with examples as disclosed herein. The configuration manager 1225 may be configured as or otherwise support a means for transmitting a configuration of a set of multiple report slot offset parameters, where a subset of the set of multiple report slot offset parameters is associated with a bandwidth part of a set of multiple bandwidth parts configured for a UE. The trigger manager 1230 may be configured as or otherwise support a means for transmitting, during a first slot, a message triggering a channel state information report on a physical uplink shared channel of the bandwidth part. The channel manager 1235 may be configured as or otherwise support a means for configuring a second slot for receiving the channel state information report based on the first slot and the subset of the set of multiple report slot offset parameters associated with the bandwidth part. The report manager 1240 may be configured as or otherwise support a means for receiving, during the second slot, the channel state information report.

In some examples, to support transmitting the configuration of the set of multiple report slot offset parameters, the configuration manager 1225 may be configured as or otherwise support a means for transmitting a separate set of report slot offset parameters for each bandwidth part of the set of multiple bandwidth parts configured for the UE.

In some examples, to support transmitting the configuration of the set of multiple report slot offset parameters, the configuration manager 1225 may be configured as or otherwise support a means for transmitting the set of multiple report slot offset parameters as a single set, where a total number of entries in the single set is equal to or greater than a total number of entries in a largest time domain resource allocation list configured for any bandwidth part of the set of multiple bandwidth parts configured for the UE.

In some examples, the subset of the set of multiple report slot offset parameters associated with the bandwidth part includes a portion of the single set corresponding to a time domain resource allocation list configured for the bandwidth part.

In some examples, configuring the second slot for receiving the channel state information report is further based on the time domain resource allocation list configured for the bandwidth part. In some examples, to support configuring the second slot for receiving the channel state information report, the channel manager 1235 may be configured as or otherwise support a means for configuring a report slot offset from the subset of the set of multiple report slot offsets associated with the bandwidth part.

In some examples, the control manager 1245 may be configured as or otherwise support a means for transmitting a set of multiple uplink power control parameters, where a subset of the set of multiple uplink power control parameters is associated with the bandwidth part.

In some examples, the subset of the set of multiple report slot offset parameters includes a time domain offset between a physical downlink control channel of the first slot and a physical uplink shared channel of the second slot.

In some examples, the message triggering the channel state information report includes a downlink control information message or a media access control (MAC) control element message.

Figure 13:
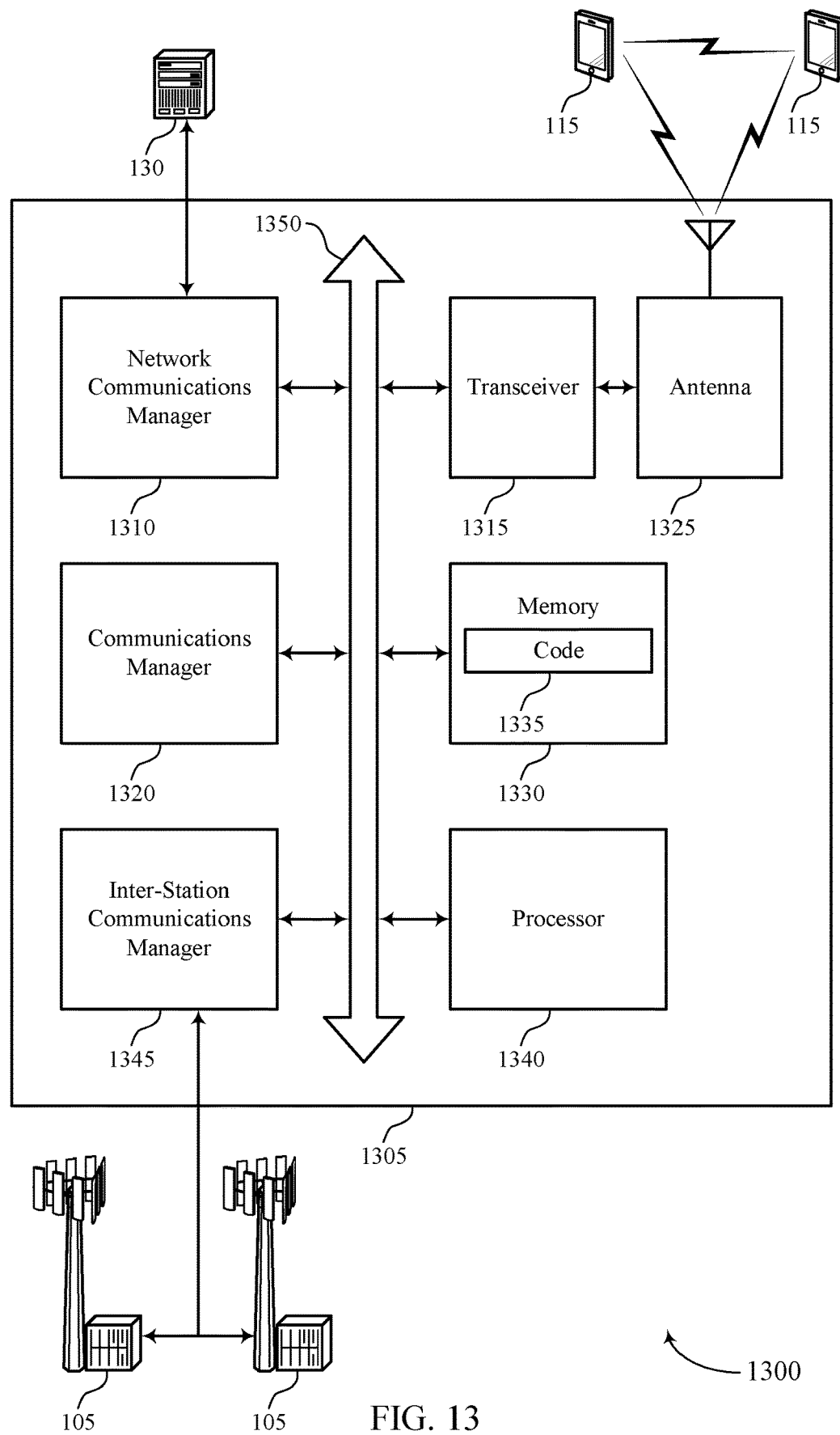
FIG. 13 shows a diagram of a system including a device that supports channel state information reporting on a physical uplink shared channel with multiple uplink bandwidth parts in accordance with aspects of the present disclosure.

FIG. 13 shows a diagram of a system 1300 including a device 1305 that supports channel state information reporting on a physical uplink shared channel with multiple uplink bandwidth parts in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting channel state information reporting on a physical uplink shared channel with multiple uplink bandwidth parts). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at a base station in accordance with examples as disclosed herein. For example, the communications manager 1320 may be configured as or otherwise support a means for transmitting a configuration of a set of multiple report slot offset parameters, where a subset of the set of multiple report slot offset parameters is associated with a bandwidth part of a set of multiple bandwidth parts configured for a UE. The communications manager 1320 may be configured as or otherwise support a means for transmitting, during a first slot, a message triggering a channel state information report on a physical uplink shared channel of the bandwidth part. The communications manager 1320 may be configured as or otherwise support a means for configuring a second slot for receiving the channel state information report based on the first slot and the subset of the set of multiple report slot offset parameters associated with the bandwidth part. The communications manager 1320 may be configured as or otherwise support a means for receiving, during the second slot, the channel state information report.

By including or configuring the communications manager 1320 in accordance with examples as described herein, the device 1305 may support techniques for reducing or removing ambiguity that may be associated with CSI reporting (e.g., when the number of offset entries in a PUSCH configuration for a given UL BWP differs from the number of entries in a time domain resource allocation list for the given UL BWP). By reducing or removing the ambiguity, processing that would have been used to resolve the ambiguity may be reserved for other uses of device 1305. Accordingly, the present techniques reduce power consumption and free up processing cycles of device 1305 by reducing or removing the ambiguity that may be associated with CSI reporting, resulting in improved communication reliability, reduced latency, improved user experience related to reduced processing, reduced power consumption, more efficient utilization of communication resources, improved coordination between device 1305 and other devices, longer battery life, and improved utilization of processing capability.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of channel state information reporting on a physical uplink shared channel with multiple uplink bandwidth parts as described herein, or the processor 1340 and the memory 1330 may be otherwise configured to perform or support such operations.

FIG. 14 shows a flowchart illustrating a method 1400 that supports channel state information reporting on a physical uplink shared channel with multiple uplink bandwidth parts in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving a configuration of a set of multiple report slot offset parameters, where a subset of the set of multiple report slot offset parameters is associated with a bandwidth part of a set of multiple bandwidth parts configured for the UE. The operations of 1405 may be performed in accordance with examples as disclosed herein. In some examples, aspects of the operations of 1405 may be performed by an offset manager 825 as described with reference to FIG. 8.

At 1410, the method may include receiving, during a first slot, a message triggering a channel state information report on a physical uplink shared channel of the bandwidth part. The operations of 1410 may be performed in accordance with examples as disclosed herein. In some examples, aspects of the operations of 1410 may be performed by a message manager 830 as described with reference to FIG. 8.

At 1415, the method may include selecting a second slot for transmitting the channel state information report based on the first slot and the subset of the set of multiple report slot offset parameters associated with the bandwidth part. The operations of 1415 may be performed in accordance with examples as disclosed herein. In some examples, aspects of the operations of 1415 may be performed by a slot manager 835 as described with reference to FIG. 8.

At 1420, the method may include transmitting, during the second slot, the channel state information report. The operations of 1420 may be performed in accordance with examples as disclosed herein. In some examples, aspects of the operations of 1420 may be performed by a channel state manager 840 as described with reference to FIG. 8.

FIG. 15 shows a flowchart illustrating a method 1500 that supports channel state information reporting on a physical uplink shared channel with multiple uplink bandwidth parts in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving a configuration of a set of multiple report slot offset parameters, where a subset of the set of multiple report slot offset parameters is associated with a bandwidth part of a set of multiple bandwidth parts configured for the UE. The operations of 1505 may be performed in accordance with examples as disclosed herein. In some examples, aspects of the operations of 1505 may be performed by an offset manager 825 as described with reference to FIG. 8.

At 1510, the method may include receiving, during a first slot, a message triggering a channel state information report on a physical uplink shared channel of the bandwidth part. The operations of 1510 may be performed in accordance with examples as disclosed herein. In some examples, aspects of the operations of 1510 may be performed by a message manager 830 as described with reference to FIG. 8.

At 1515, the method may include selecting a second slot for transmitting the channel state information report based on the first slot and the subset of the set of multiple report slot offset parameters associated with the bandwidth part. The operations of 1515 may be performed in accordance with examples as disclosed herein. In some examples, aspects of the operations of 1515 may be performed by a slot manager 835 as described with reference to FIG. 8.

At 1520, the method may include transmitting, during the second slot, the channel state information report. The operations of 1520 may be performed in accordance with examples as disclosed herein. In some examples, aspects of the operations of 1520 may be performed by a channel state manager 840 as described with reference to FIG. 8.

At 1525, the method may include receiving a separate set of report slot offset parameters for each bandwidth part of the set of multiple bandwidth parts configured for the UE. The operations of 1525 may be performed in accordance with examples as disclosed herein. In some examples, aspects of the operations of 1525 may be performed by an offset manager 825 as described with reference to FIG. 8.

FIG. 16 shows a flowchart illustrating a method 1600 that supports channel state information reporting on a physical uplink shared channel with multiple uplink bandwidth parts in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1605, the method may include receiving a configuration of a set of multiple report slot offset parameters, where a subset of the set of multiple report slot offset parameters is associated with a bandwidth part of a set of multiple bandwidth parts configured for the UE. The operations of 1605 may be performed in accordance with examples as disclosed herein. In some examples, aspects of the operations of 1605 may be performed by an offset manager 825 as described with reference to FIG. 8.

At 1610, the method may include receiving, during a first slot, a message triggering a channel state information report on a physical uplink shared channel of the bandwidth part. The operations of 1610 may be performed in accordance with examples as disclosed herein. In some examples, aspects of the operations of 1610 may be performed by a message manager 830 as described with reference to FIG. 8.

At 1615, the method may include selecting a second slot for transmitting the channel state information report based on the first slot and the subset of the set of multiple report slot offset parameters associated with the bandwidth part. The operations of 1615 may be performed in accordance with examples as disclosed herein. In some examples, aspects of the operations of 1615 may be performed by a slot manager 835 as described with reference to FIG. 8.

At 1620, the method may include transmitting, during the second slot, the channel state information report. The operations of 1620 may be performed in accordance with examples as disclosed herein. In some examples, aspects of the operations of 1620 may be performed by a channel state manager 840 as described with reference to FIG. 8.

At 1625, the method may include receiving the set of multiple report slot offset parameters as a single set, where a total number of entries in the single set is equal to or greater than a total number of entries in a largest time domain resource allocation list configured for any bandwidth part of the set of multiple bandwidth parts configured for the UE. The operations of 1625 may be performed in accordance with examples as disclosed herein. In some examples, aspects of the operations of 1625 may be performed by an offset manager 825 as described with reference to FIG. 8.

FIG. 17 shows a flowchart illustrating a method 1700 that supports channel state information reporting on a physical uplink shared channel with multiple uplink bandwidth parts in accordance with aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1705, the method may include transmitting a configuration of a set of multiple report slot offset parameters, where a subset of the set of multiple report slot offset parameters is associated with a bandwidth part of a set of multiple bandwidth parts configured for a UE. The operations of 1705 may be performed in accordance with examples as disclosed herein. In some examples, aspects of the operations of 1705 may be performed by a configuration manager 1225 as described with reference to FIG. 12.

At 1710, the method may include transmitting, during a first slot, a message triggering a channel state information report on a physical uplink shared channel of the bandwidth part. The operations of 1710 may be performed in accordance with examples as disclosed herein. In some examples, aspects of the operations of 1710 may be performed by a trigger manager 1230 as described with reference to FIG. 12.

At 1715, the method may include configuring a second slot for receiving the channel state information report based on the first slot and the subset of the set of multiple report slot offset parameters associated with the bandwidth part. The operations of 1715 may be performed in accordance with examples as disclosed herein. In some examples, aspects of the operations of 1715 may be performed by a channel manager 1235 as described with reference to FIG. 12.

At 1720, the method may include receiving, during the second slot, the channel state information report. The operations of 1720 may be performed in accordance with examples as disclosed herein. In some examples, aspects of the operations of 1720 may be performed by a report manager 1240 as described with reference to FIG. 12.

FIG. 18 shows a flowchart illustrating a method 1800 that supports channel state information reporting on a physical uplink shared channel with multiple uplink bandwidth parts in accordance with aspects of the present disclosure. The operations of the method 1800 may be implemented by a base station or its components as described herein. For example, the operations of the method 1800 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1805, the method may include transmitting a configuration of a set of multiple report slot offset parameters, where a subset of the set of multiple report slot offset parameters is associated with a bandwidth part of a set of multiple bandwidth parts configured for a UE. The operations of 1805 may be performed in accordance with examples as disclosed herein. In some examples, aspects of the operations of 1805 may be performed by a configuration manager 1225 as described with reference to FIG. 12.

At 1810, the method may include transmitting, during a first slot, a message triggering a channel state information report on a physical uplink shared channel of the bandwidth part. The operations of 1810 may be performed in accordance with examples as disclosed herein. In some examples, aspects of the operations of 1810 may be performed by a trigger manager 1230 as described with reference to FIG. 12.

At 1815, the method may include configuring a second slot for receiving the channel state information report based on the first slot and the subset of the set of multiple report slot offset parameters associated with the bandwidth part. The operations of 1815 may be performed in accordance with examples as disclosed herein. In some examples, aspects of the operations of 1815 may be performed by a channel manager 1235 as described with reference to FIG. 12.

At 1820, the method may include receiving, during the second slot, the channel state information report. The operations of 1820 may be performed in accordance with examples as disclosed herein. In some examples, aspects of the operations of 1820 may be performed by a report manager 1240 as described with reference to FIG. 12.

At 1825, the method may include transmitting a separate set of report slot offset parameters for each bandwidth part of the set of multiple bandwidth parts configured for the UE. The operations of 1825 may be performed in accordance with examples as disclosed herein. In some examples, aspects of the operations of 1825 may be performed by a configuration manager 1225 as described with reference to FIG. 12.

FIG. 19 shows a flowchart illustrating a method 1900 that supports channel state information reporting on a physical uplink shared channel with multiple uplink bandwidth parts in accordance with aspects of the present disclosure. The operations of the method 1900 may be implemented by a base station or its components as described herein. For example, the operations of the method 1900 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1905, the method may include transmitting a configuration of a set of multiple report slot offset parameters, where a subset of the set of multiple report slot offset parameters is associated with a bandwidth part of a set of multiple bandwidth parts configured for a UE. The operations of 1905 may be performed in accordance with examples as disclosed herein. In some examples, aspects of the operations of 1905 may be performed by a configuration manager 1225 as described with reference to FIG. 12.

At 1910, the method may include transmitting, during a first slot, a message triggering a channel state information report on a physical uplink shared channel of the bandwidth part. The operations of 1910 may be performed in accordance with examples as disclosed herein. In some examples, aspects of the operations of 1910 may be performed by a trigger manager 1230 as described with reference to FIG. 12.

At 1915, the method may include configuring a second slot for receiving the channel state information report based on the first slot and the subset of the set of multiple report slot offset parameters associated with the bandwidth part. The operations of 1915 may be performed in accordance with examples as disclosed herein. In some examples, aspects of the operations of 1915 may be performed by a channel manager 1235 as described with reference to FIG. 12.

At 1920, the method may include receiving, during the second slot, the channel state information report. The operations of 1920 may be performed in accordance with examples as disclosed herein. In some examples, aspects of the operations of 1920 may be performed by a report manager 1240 as described with reference to FIG. 12.

At 1925, the method may include transmitting the set of multiple report slot offset parameters as a single set, where a total number of entries in the single set is equal to or greater than a total number of entries in a largest time domain resource allocation list configured for any bandwidth part of the set of multiple bandwidth parts configured for the UE. The operations of 1925 may be performed in accordance with examples as disclosed herein. In some examples, aspects of the operations of 1925 may be performed by a configuration manager 1225 as described with reference to FIG. 12.

The following provides an overview of aspects of the present disclosure:

Aspect 1: A method for wireless communication at a UE, comprising: receiving a configuration of a plurality of report offset parameters, wherein a subset of the plurality of report offset parameters is associated with a bandwidth part of a plurality of bandwidth parts configured for the UE; receiving, during a first slot, a message triggering a channel state information report on a physical uplink shared channel of the bandwidth part; selecting a second slot for transmitting the channel state information report based at least in part on the first slot and the subset of the plurality of report offset parameters associated with the bandwidth part; and transmitting, during the second slot, the channel state information report.

Aspect 2: The method of aspect 1, wherein receiving the configuration of the plurality of report offset parameters comprises: receiving a separate set of report offset parameters for each bandwidth part of the plurality of bandwidth parts configured for the UE.

Aspect 3: The method of any of aspects 1 through 2, wherein receiving the configuration of the plurality of report offset parameters comprises: receiving the plurality of report offset parameters as a single set, wherein a total number of entries in the single set is equal to or greater than a total number of entries in a largest time domain resource allocation list configured for any bandwidth part of the plurality of bandwidth parts configured for the UE.

Aspect 4: The method of aspect 3, wherein the subset of the plurality of report offset parameters associated with the bandwidth part comprises a portion of the single set with a same number of entries as a time domain resource allocation list configured for the bandwidth part.

Aspect 5: The method of aspect 4, wherein selecting the second slot for transmitting the channel state information report comprises: determining a resource allocation for the second slot, wherein determining the resource allocation for the second slot is based at least in part on the time domain resource allocation list configured for the bandwidth part.

Aspect 6: The method of any of aspects 1 through 5, wherein selecting the second slot for transmitting the channel state information report comprises: selecting a report slot offset from the subset of the plurality of report slot offsets associated with the bandwidth part.

Aspect 7: The method of any of aspects 1 through 6, further comprising: receiving a plurality of uplink power control parameters, wherein a subset of the plurality of uplink power control parameters is associated with the bandwidth part.

Aspect 8: The method of aspect 7, further comprising: selecting a power control parameter of the subset of the plurality of uplink power control parameters based at least in part on the bandwidth part.

Aspect 9: The method of any of aspects 7 through 8, wherein a transmit power of the channel state information report is based at least in part on the selected uplink power control parameter.

Aspect 10: The method of any of aspects 1 through 9, wherein selecting the second slot for transmitting the channel state information report comprises: performing a measurement of a channel state information reference signal, wherein the channel state information report is based at least in part on the measurement.

Aspect 11: The method of any of aspects 1 through 10, wherein the subset of the plurality of report offset parameters comprises a time domain offset between a physical downlink control channel of the first slot and a physical uplink shared channel of the second slot.

Aspect 12: The method of any of aspects 1 through 11, wherein the message triggering the channel state information report comprises a downlink control information message or a media access control control element message.

Aspect 13: A method for wireless communication at a base station, comprising: transmitting a configuration of a plurality of report offset parameters, wherein a subset of the plurality of report offset parameters is associated with a bandwidth part of a plurality of bandwidth parts configured for a UE; transmitting, during a first slot, a message triggering a channel state information report on a physical uplink shared channel of the bandwidth part; configuring a second slot for receiving the channel state information report based at least in part on the first slot and the subset of the plurality of report offset parameters associated with the bandwidth part; and receiving, during the second slot, the channel state information report.

Aspect 14: The method of aspect 13, wherein transmitting the configuration of the plurality of report offset parameters comprises: transmitting a separate set of report offset parameters for each bandwidth part of the plurality of bandwidth parts configured for the UE.

Aspect 15: The method of any of aspects 13 through 14, wherein transmitting the configuration of the plurality of report offset parameters comprises: transmitting the plurality of report offset parameters as a single set, wherein a total number of entries in the single set is equal to or greater than a total number of entries in a largest time domain resource allocation list configured for any bandwidth part of the plurality of bandwidth parts configured for the UE.

Aspect 16: The method of aspect 15, wherein the subset of the plurality of report offset parameters associated with the bandwidth part comprises a portion of the single set corresponding to a time domain resource allocation list configured for the bandwidth part.

Aspect 17: The method of aspect 16, wherein configuring the second slot for receiving the channel state information report is further based at least in part on the time domain resource allocation list configured for the bandwidth part.

Aspect 18: The method of any of aspects 13 through 17, wherein configuring the second slot for receiving the channel state information report comprises: configuring a report slot offset from the subset of the plurality of report slot offsets associated with the bandwidth part.

Aspect 19: The method of any of aspects 13 through 18, further comprising: transmitting a plurality of uplink power control parameters, wherein a subset of the plurality of uplink power control parameters is associated with the bandwidth part.

Aspect 20: The method of any of aspects 13 through 19, wherein the subset of the plurality of report offset parameters comprises a time domain offset between a physical downlink control channel of the first slot and a physical uplink shared channel of the second slot.

Aspect 21: The method of any of aspects 13 through 20, wherein the message triggering the channel state information report comprises a downlink control information message or a media access control control element message.

Aspect 22: An apparatus for wireless communication at a UE, comprising a processor; memory coupled with the processor; and instructions stored in the memory and executable by the processor to cause the apparatus to perform a method of any of aspects 1 through 12.

Aspect 23: An apparatus for wireless communication at a UE, comprising at least one means for performing a method of any of aspects 1 through 12.

Aspect 24: A non-transitory computer-readable medium storing code for wireless communication at a UE, the code comprising instructions executable by a processor to perform a method of any of aspects 1 through 12.

Aspect 25: An apparatus for wireless communication at a base station, comprising a processor; memory coupled with the processor; and instructions stored in the memory and executable by the processor to cause the apparatus to perform a method of any of aspects 13 through 21.

Aspect 26: An apparatus for wireless communication at a base station, comprising at least one means for performing a method of any of aspects 13 through 21.

Aspect 27: A non-transitory computer-readable medium storing code for wireless communication at a base station, the code comprising instructions executable by a processor to perform a method of any of aspects 13 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving a configuration of a plurality of report slot offset parameters as a single set, wherein a subset of the plurality of report slot offset parameters is associated with a bandwidth part of a plurality of bandwidth parts configured for the UE, and wherein a total number of entries in the single set is equal to or greater than a total number of entries in a largest time domain resource allocation list configured for any bandwidth part of the plurality of bandwidth parts configured for the UE;
   receiving, during a first slot, a message triggering a channel state information report on a physical uplink shared channel of the bandwidth part;
   selecting a second slot for transmitting the channel state information report based at least in part on the first slot and the subset of the plurality of report slot offset parameters associated with the bandwidth part; and
   transmitting, during the second slot, the channel state information report.

2. The method of claim 1, further comprising:
   receiving a plurality of uplink power control parameters, wherein a subset of the plurality of uplink power control parameters is associated with the bandwidth part.

3. A method for wireless communication at a network entity, comprising:
   transmitting a configuration of a plurality of report slot offset parameters as a single set, wherein a subset of the plurality of report slot offset parameters is associated with a bandwidth part of a plurality of bandwidth parts configured for a user equipment (UE), and wherein a total number of entries in the single set is equal to or greater than a total number of entries in a largest time domain resource allocation list configured for any bandwidth part of the plurality of bandwidth parts configured for the UE;
   transmitting, during a first slot, a message triggering a channel state information report on a physical uplink shared channel of the bandwidth part;
   configuring a second slot for receiving the channel state information report based at least in part on the first slot and the subset of the plurality of report slot offset parameters associated with the bandwidth part; and
   receiving, during the second slot, the channel state information report.

4. The method of claim 3, further comprising:
   transmitting a plurality of uplink power control parameters, wherein a subset of the plurality of uplink power control parameters is associated with the bandwidth part.

5. An apparatus for wireless communication at a user equipment (UE), comprising:
   at least one processor; and
   memory coupled with the at least one processor, the memory storing instructions executable by the at least one processor to cause the UE to:
      receive a configuration of a plurality of report slot offset parameters as a single set, wherein a subset of the plurality of report slot offset parameters is associated with a bandwidth part of a plurality of bandwidth parts configured for the UE, and wherein a total number of entries in the single set is equal to or greater than a total number of entries in a largest time domain resource allocation list configured for any bandwidth part of the plurality of bandwidth parts configured for the UE;
      receive, during a first slot, a message triggering a channel state information report on a physical uplink shared channel of the bandwidth part;
      select a second slot for transmitting the channel state information report based at least in part on the first slot and the subset of the plurality of report slot offset parameters associated with the bandwidth part; and transmit, during the second slot, the channel state information report.

6. The apparatus of claim 5, wherein the subset of the plurality of report slot offset parameters associated with the bandwidth part comprises a portion of the single set with a same number of entries as a time domain resource allocation list configured for the bandwidth part.

7. The apparatus of claim 6, wherein the instructions to select the second slot for transmitting the channel state information report are executable by the at least one processor to cause the UE to:

determine a resource allocation for the second slot, wherein determining the resource allocation for the second slot is based at least in part on the time domain resource allocation list configured for the bandwidth part.

8. The apparatus of claim 5, wherein the instructions to select the second slot for transmitting the channel state information report are executable by the at least one processor to cause the UE to:

select a report slot offset from the subset of the plurality of report slot offsets associated with the bandwidth part.

9. The apparatus of claim 5, wherein the instructions are further executable by the at least one processor to cause the UE to:

receive a plurality of uplink power control parameters, wherein a subset of the plurality of uplink power control parameters is associated with the bandwidth part.

10. The apparatus of claim 9, wherein the instructions are further executable by the at least one processor to cause the UE to:

select an uplink power control parameter of the subset of the plurality of uplink power control parameters based at least in part on the bandwidth part.

11. The apparatus of claim 9, wherein a transmit power of the channel state information report is based at least in part on the selected uplink power control parameter.

12. The apparatus of claim 5, wherein the instructions to select the second slot for transmitting the channel state information report are executable by the at least one processor to cause the UE to:

perform a measurement of a channel state information reference signal, wherein the channel state information report is based at least in part on the measurement.

13. The apparatus of claim 5, wherein the subset of the plurality of report slot offset parameters comprises a time domain offset between a physical downlink control channel of the first slot and the physical uplink shared channel of the second slot.

14. The apparatus of claim 5, wherein the message triggering the channel state information report comprises a downlink control information message or a media access control control element message.

15. An apparatus for wireless communication at a network entity, comprising:

at least one processor;

memory coupled with the at least one processor, the memory storing instructions executable by the at least one processor to cause the network entity to:

transmit a configuration of a plurality of report slot offset parameters as a single set, wherein a subset of the plurality of report slot offset parameters is associated with a bandwidth part of a plurality of bandwidth parts configured for a user equipment (UE), and wherein a total number of entries in the single set is equal to or greater than a total number of entries in a largest time domain resource allocation list configured for any bandwidth part of the plurality of bandwidth parts configured for the UE;

transmit, during a first slot, a message triggering a channel state information report on a physical uplink shared channel of the bandwidth part;

configure a second slot for receiving the channel state information report based at least in part on the first slot and the subset of the plurality of report slot offset parameters associated with the bandwidth part; and receive, during the second slot, the channel state information report.

16. The apparatus of claim 15, wherein the subset of the plurality of report slot offset parameters associated with the bandwidth part comprises a portion of the single set corresponding to a time domain resource allocation list configured for the bandwidth part.

17. The apparatus of claim 16, wherein configuring the second slot for receiving the channel state information report is further based at least in part on the time domain resource allocation list configured for the bandwidth part.

18. The apparatus of claim 15, wherein the instructions to configure the second slot for receiving the channel state information report are executable by the at least one processor to cause the network entity to:

configure a report slot offset from the subset of the plurality of report slot offsets associated with the bandwidth part.

19. The apparatus of claim 15, wherein the instructions are further executable by the at least one processor to cause the network entity to:

transmit a plurality of uplink power control parameters, wherein a subset of the plurality of uplink power control parameters is associated with the bandwidth part.

20. The apparatus of claim 15, wherein the subset of the plurality of report slot offset parameters comprises a time domain offset between a physical downlink control channel of the first slot and the physical uplink shared channel of the second slot.

21. The apparatus of claim 15, wherein the message triggering the channel state information report comprises a downlink control information message or a media access control control element message.

* * * * *